United States Patent
Higurashi et al.

(10) Patent No.: US 7,813,585 B2
(45) Date of Patent: Oct. 12, 2010

(54) IMAGE PROCESSING APPARATUS, IMAGE PROCESSING METHOD, AND DISTORTION CORRECTING METHOD

(75) Inventors: Masaki Higurashi, Hachioji (JP); Hideaki Furukawa, Akiruno (JP); Akiro Ueno, Akiruno (JP)

(73) Assignee: Olympus Corporation, Tokyo (JP)

( * ) Notice: Subject to any disclaimer, the term of this patent is extended or adjusted under 35 U.S.C. 154(b) by 765 days.

(21) Appl. No.: 10/566,408

(22) PCT Filed: Jul. 27, 2004

(86) PCT No.: PCT/JP2004/011010
§ 371 (c)(1), (2), (4) Date: Jan. 26, 2006

(87) PCT Pub. No.: WO2005/010818
PCT Pub. Date: Feb. 3, 2005

(65) Prior Publication Data
US 2006/0188172 A1    Aug. 24, 2006

(30) Foreign Application Priority Data

| Jul. 28, 2003 | (JP) | 2003-202493 |
| Jul. 28, 2003 | (JP) | 2003-202663 |
| Jul. 28, 2003 | (JP) | 2003-202664 |

(51) Int. Cl.
- G06K 9/40   (2006.01)
- G06K 9/32   (2006.01)
- G06K 9/62   (2006.01)
- G03B 21/14  (2006.01)
- G03H 1/00   (2006.01)

(52) U.S. Cl. ........ 382/275; 382/274; 382/215; 382/293; 382/300; 353/69; 359/13; 359/14

(58) Field of Classification Search ......... 382/275, 382/293, 300
See application file for complete search history.

(56) References Cited

U.S. PATENT DOCUMENTS 5,796,426 A    8/1998   Gullichsen et al.

(Continued)

FOREIGN PATENT DOCUMENTS

EP    2000-196939    7/2000

(Continued)

OTHER PUBLICATIONS

Wolberg and Boult, "Separable Image Warping With Spatial Lookup Tables," Computer Graphics, 23(3), pp. 369-378, Jul. 1, 1989.

*Primary Examiner*—Vikkram Bali
*Assistant Examiner*—Michelle Entezari
(74) *Attorney, Agent, or Firm*—Volpe and Koenig, P.C.

(57) ABSTRACT

An image processing apparatus has a distortion correction processing unit. The image processing apparatus has a distortion correcting range calculating unit that calculates an input image range necessary for distortion correction processing of the distortion correction processing unit. Thus, the corrected image (output image) obtained by the distortion correction processing can be outputted without overs and shorts for the image output range. The distortion is corrected by effectively using input (picked-up) image data, serving as the original data. Further, the distortion including the pincushion distortion, the barrel distortion, and the curvilinear distortion is effectively corrected.

9 Claims, 37 Drawing Sheets

U.S. PATENT DOCUMENTS

| | | | |
|---|---|---|---|
| 5,940,544 A * | 8/1999 | Nako | 382/293 |
| 5,966,678 A * | 10/1999 | Lam | 702/97 |
| 6,642,971 B2 * | 11/2003 | Takeuchi | 348/746 |
| 6,747,702 B1 | 6/2004 | Harrigan | |
| 6,801,671 B1 * | 10/2004 | Suzuki et al. | 382/275 |
| 7,576,744 B2 * | 8/2009 | Kurumisawa | 345/501 |
| 2002/0122124 A1 * | 9/2002 | Suda | 348/263 |
| 2002/0164083 A1 * | 11/2002 | Song et al. | 382/275 |
| 2003/0215230 A1 * | 11/2003 | Gallagher | 396/311 |

FOREIGN PATENT DOCUMENTS

| | | |
|---|---|---|
| JP | 02-252375 | 10/1990 |
| JP | 06-153065 | 5/1994 |
| JP | 06-165024 | 6/1994 |
| JP | 06-181530 | 6/1994 |
| JP | 06-237412 | 8/1994 |
| JP | 08-126009 | 5/1996 |
| JP | 08-272964 | 10/1996 |
| JP | 09-098340 | 4/1997 |
| JP | 09-252391 | 9/1997 |
| JP | 10-224695 | 8/1998 |
| JP | 11-243508 | 9/1999 |
| JP | 11-250239 | 9/1999 |
| JP | 11-275391 | 10/1999 |
| JP | 2000-047658 | 2/2000 |
| JP | 2000-132673 | 5/2000 |
| JP | 2000-312327 | 11/2000 |
| JP | 2001-101396 | 4/2001 |
| JP | 2002-268624 | 9/2002 |
| JP | 2003-030633 | 1/2003 |

* cited by examiner

INPUT DATA

INTERPOLATION POSITION CORRESPONDING TO OUTPUT DATA

AMOUNT OF BUFFER NECESSARY FOR PROCESSING (16-POINT INTERPOLATION)

VARIED DATA WIDTH NECESSARY FOR PROCESSING

D0  D1  D2  D3

D4  D5  D6  D7
        ○ ← CORRECTING COORDINATE POSITION P (X', Y')
D8  D9  D10  D11

D12  D13  D14  D15

ORDER OF INPUT UL (N : INTEGER)

4N, 4N+4, 4N+8, 4N+12, 4N+1, 4N+5, 4N+9, 4N+13, 4N+2, 4N+6, 4N+10, 4N+14, 4N+3, 4N+7, 4N+11, 4N+15

ADDRESS

No. 0: addresses 0,1,2 contain 0,4,8; address 23 contains 92 (×4 columns)
No. 1, No. 2, No. 3: same pattern No. 4–7: 1,5,9 ... 93
No. 8–11: 2,6,10 ... 94
No. 12–15: 3,7,11 ... 95

FIG.41
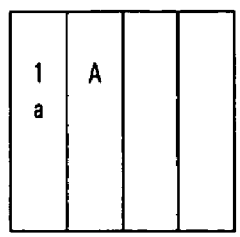
No. 0
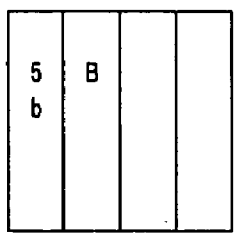
No. 1
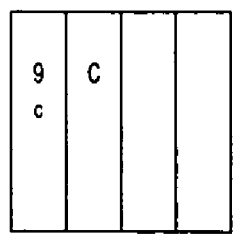
No. 2
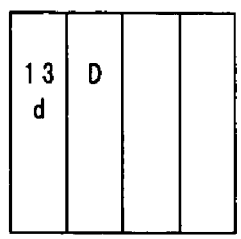
No. 3
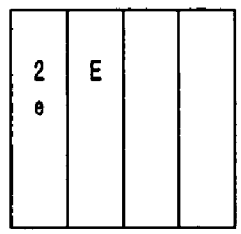
No. 4
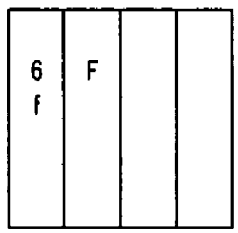
No. 5
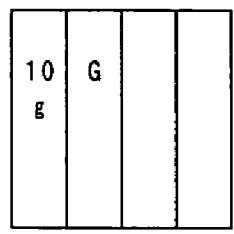
No. 6
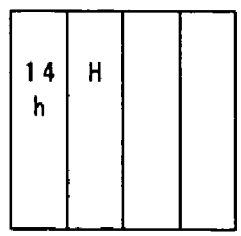
No. 7
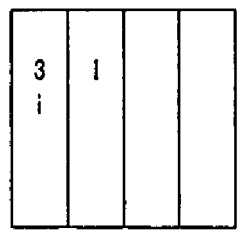
No. 8
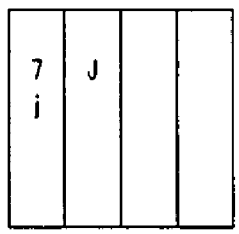
No. 9
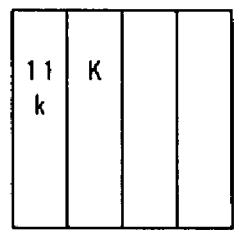
No. 10
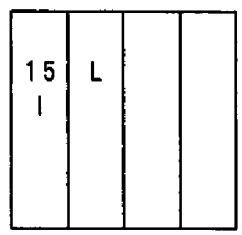
No. 11
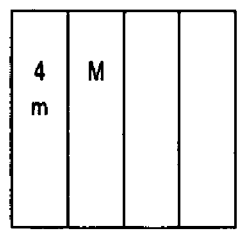
No. 12
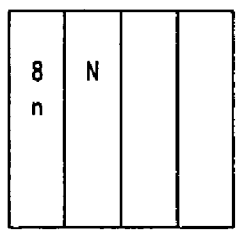
No. 13
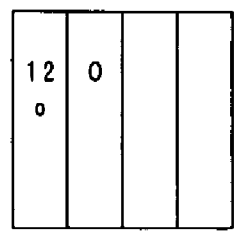
No. 14
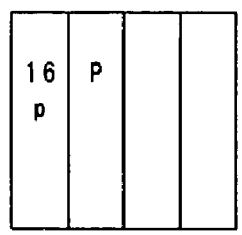
No. 15 ex. INTERPOLATION POSITION=$(4N+10+\alpha_0, 50+\alpha_1)$  ($\alpha_*$ : DECIMAL)

READ ADDRESS TO MEMORY

No. 5, 6, 7, 9, 10, 11, 13, 14, 15 : 60 (=24 * 2+12)
No. 4, 8, 12 : 84 (=24 * 3+12)
No. 1, 2, 3 : 61 (=24 * 2+13)
No. 0 : 85 (=24 * 3+13)

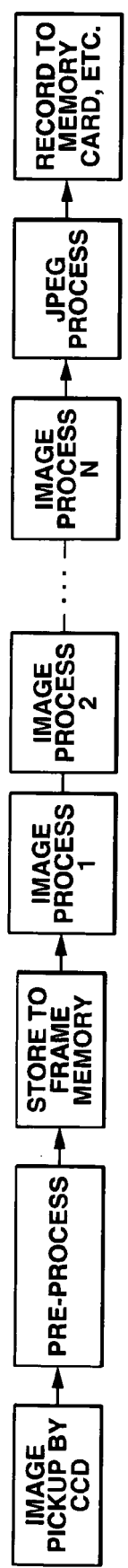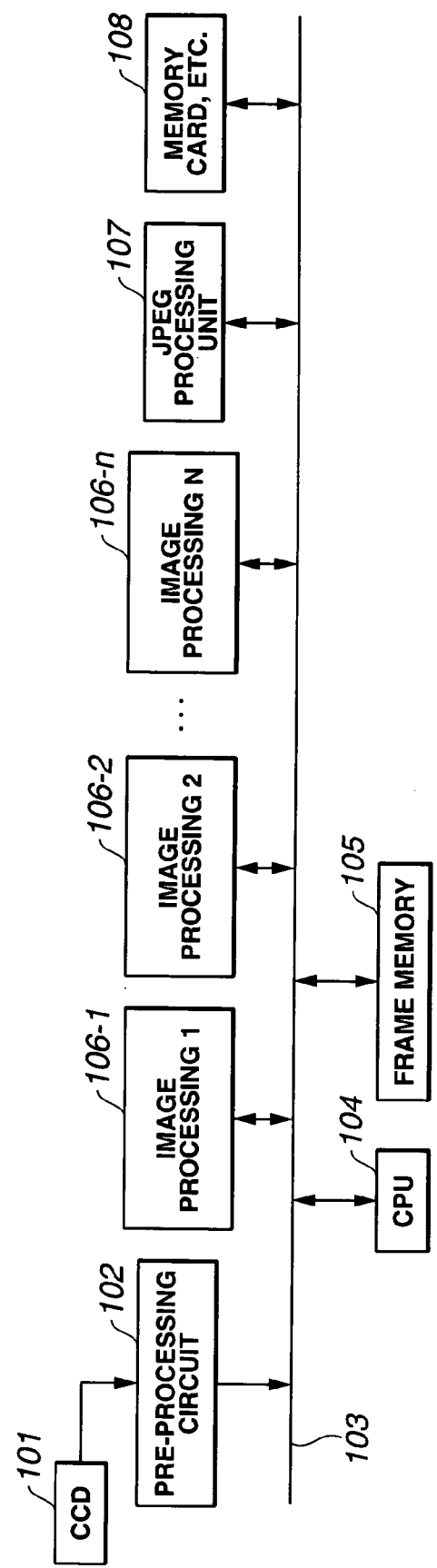

IMAGE PROCESSING APPARATUS, IMAGE PROCESSING METHOD, AND DISTORTION CORRECTING METHOD

CROSS REFERENCE TO RELATED APPLICATION

This application is a continuation application of PCT/JP2004/011010 filed on Jul. 27, 2004 and claims benefit of Japanese Applications No. 2003-202493 filed in Japan on Jul. 28, 2003, Ser. No. 2003-202663 filed in Japan on Jul. 28, 2003, and Ser. No. 2003-202664 filed in Japan on Jul. 28, 2003, the entire contents of which are incorporated herein by this reference.

BACKGROUND OF THE INVENTION

1. Field of the Invention

The present invention mainly relates to an image processing apparatus and an image processing method used for an electronic image pickup device, such as a digital camera. In particular, the present invention relates to an image processing apparatus, an image processing method, and a distortion correcting method, in which a distortion correcting function is realized without increasing the circuit scale and the amount of transfer data and the spatial position of a small region can be calculated in the distortion correction processing in units of a small region (e.g., block line).

2. Description of the Related Art

Irrespective of a digital camera or a silver-halide film camera, the distortion aberration generally appears in a camera optical system. Further, most types of cameras currently-released have an optical zoom function. In such a case, the distortion aberration state changes from the wide end to the tele end. At the wide end, a barrel distortion frequently appears. At the tele end, a pincushion distortion frequently appears.

For example, a grid subject is photographed and then the distortion aberration is observed as the barrel distortion or pincushion distortion.

FIG. 56 shows a grid subject. FIG. 57 shows a photographed image with the barrel distortion. FIG. 58 shows a photographed image with the pincushion distortion.

Meanwhile, in the digital camera, data of an image pickup element, such as a CCD, is subjected to various image processing, then, the data is compressed in a JPEG compression format, and the compressed data is recorded to a recording medium, such as a memory card.

FIG. 59 shows the concept of image processing sequence in the general digital camera. An image pickup signal captured by the CCD is subjected to pixel defect processing and A/D conversion in the pre-processing. The obtained image data is temporarily stored in a frame memory, such as an SDRAM. Subsequently, the image data read from the frame memory is subjected to various image processing. Further, the image data is compressed in JPEG processing and is recorded in a memory card, serving as a recording medium.

FIG. 60 is a block diagram showing a conventional image processing apparatus for digital camera (according to e.g., one conventional art disclosed in Japanese Unexamined Patent Application Publication No. 2000-312327).

Referring to FIG. 60, the conventional image processing apparatus has a bus 103, to which a CPU 104, a pre-processing circuit 102, a plurality of image processing circuits 106-1 to 106-n, a JPEG processing unit 107, a frame memory 105 and a memory card 108, serving as a recording medium, are connected. Then, under the control of the CPU 104, an image pickup signal from a CCD 101 is subjected to pixel defect processing and A/D conversion by the pre-processing circuit 102 and is then temporarily stored in the frame memory 105 via the bus 103. Subsequently, the image data is read from the frame memory 105, and the data is inputted to the image processing circuit 106-1 via the bus 103 to be subjected to predetermined image processing. Then, the data is rewritten again to the frame memory 105 via the bus 103. Similarly, the data is received and transmitted between the frame memory 105 and the image processing circuits 106-2 to 106-n via the bus 103. Finally, the JPEG processing unit 107 JPEG-compresses the data, and the compressed data is temporarily stored in the frame memory 105. The processed data read from the frame memory 105 is recorded in a memory card 108. In each image processing and JPEG processing, the image processing is performed in units of small region (block line).

In at least one of the image processing circuits, with the distortion correcting method as described with reference to FIGS. 56 to 58, the following distortion correcting formula [Formula 5] optically expressed is used, thereby correcting the distortion aberration of the picked-up image.

$$Z^2 = (X - X_d)^2 + (Y - Y_d)^2 \qquad \text{[Formula 5]}$$

$$\begin{cases} X' = (X - X_d) \cdot [1 + A \cdot Z^2] + X_d \\ Y' = (Y - Y_d) \cdot [1 + A \cdot Z^2] + Y_d \end{cases}$$

(X, Y): Coordinates in corrected image (X', Y'): Coordinates in picked-up image $(X_d, Y_d)$: Distortion center A: Distortion correcting coefficient However, in the distortion correction using [Formula 5] optically expressed, the corrected image has a data unused/data shortage portion.

FIGS. 61 and 62 explain the operation for correcting the distortion aberration of the picked-up images having the barrel distortion and the pincushion distortion with [Formula 5].

Referring to FIG. 61, an original image (on the left in the drawing) with the barrel distortion shown by a broken line is corrected by [Formula 5], and the corrected image (on the right in the drawing) is having an unused portion out of an image output range.

Referring to FIG. 62, an original image (on the left in the drawing) with the pincushion distortion shown by a broken line is corrected by [Formula 5], and the corrected image (on the right in the drawing) is smaller than the image output range and causes a data shortage portion.

Against the inconvenience shown in FIGS. 61 and 62, Japanese Unexamined Patent Application Publication No. 9-098340, serving as a prior application, discloses such a technology that the decompressed portion, as a result of the correction, is reduced by the electronic zoom operation after the distortion correction processing and is returned to the original position, thereby suppressing image information lost as a result of distortion correction processing at the minimum level.

Generally, the reading operation of an image pickup element, such as a CCD, includes two types of reading operation: (1) reading operation of all pixels for main image pickup; and (2) thinning-out and reading operation of through image. Since the image data which is partly stored from the picked-up data by the thinning-out and reading operation does not have (1:1) aspect ratio, the distortion correction processing of the image data without additional processing is not precisely performed.

Further, another conventional technology for distortion correction, as a part of the image processing, is disclosed in, e.g., Japanese Unexamined Patent Application Publication No. 6-181530, and Japanese Unexamined Patent Application Publication No. 10-224695.

As disclosed in Japanese Unexamined Patent Application Publication No. 6-181530, when detecting means detects that the image pickup position of an image pickup zoom lens in the image pickup operation is within the position with a large distortion aberration, the geometric distortion of the image captured through the image pickup zoom lens is corrected by reading the image pickup data of a solid-state image pickup element based on geometric modification.

Further, as disclosed in Japanese Unexamined Patent Application Publication No. 10-224695, a solid-state image pickup device receives subject light via an optical system and picks up an image of the subject. The image-picked-up data is stored in a random access video memory, a random-reading timing generating circuit, having distortion correction data for correcting the aberration generated by the optical system, reads a signal generated by the solid-state image pickup device in a predetermined order based on the distortion correction data, and generates a video signal, thereby correcting the distortion aberration generated by the optical system.

SUMMARY OF THE INVENTION

According to the present invention, an image processing apparatus comprising a distortion correcting unit, further comprises a distortion correcting range calculating unit that calculates an input image range for distortion correction processing performed by the distortion correcting unit.

As mentioned above, the distortion correcting range calculating unit for calculating the input image range for distortion correction processing is provided and calculates a sizeable proportional range of a region corresponding to a part or the entire output range of an output image (i.e., image after the distortion correction processing) to an image (i.e., picked-up image), thereby without overs and shorts outputting the corrected image obtained by the distortion correction within the calculated output range. Thus, the over/insufficient corrected image against the output range is prevented.

Preferably, the distortion correcting range calculating unit comprises: a coordinate generating unit that generates interpolation coordinates; a distortion-correction coordinate transforming unit that outputs a coordinate transformed by applying a predetermined distortion correcting formula to the generated interpolation coordinate; and a correcting range detecting unit that calculates the input image range from the transformed coordinate position.

With the configuration, in the generation of the interpolation coordinates, the position of the corrected image (output image) to be outputted after the correction is generated in advance so as to obtain the position of the picked-up image (input image) before the distortion correction processing. By applying the distortion correcting formula to the interpolation coordinates, the image position (coordinates) before the distortion correction processing is generated (transformed) and outputted, and the input image range in which the distortion correction processing is necessary is calculated based on the transformed coordinate position before the processing of the correction.

Alternatively, preferably, the distortion correcting range calculating unit calculates the input image range, from at least one of the maximum value and the minimum value of the coordinates of pixels corresponding to four sides of the output image range and the coordinates corresponding to pixels of four vertexes of the output image range, with respect to the coordinates generated by the coordinate transformation. With the configuration, the four vertexes mean the tops of the sides of the output image after the distortion correction processing.

Alternatively, preferably, the distortion correcting range calculating unit sequentially repeats the range calculation of a plurality of input signals for distortion correction processing, and calculates the input image range.

With the configuration, during the distortion correction of a plurality of input signals via a plurality of channels, the calculation of distortion correcting range is sequentially repeated relative to a plurality of input signals based on the block line, serving as the processing target, thereby calculating the range of a plurality of channels with one distortion correcting range calculating unit.

Preferably, the range calculation is repeated and a correcting magnification M is determined such that the image range after the distortion correction processing comes within a predetermined range with respect to the input image range.

With the configuration, the correcting magnification M is determined to be a proper one, thereby responsible to the curvilinear distortion too.

Preferably, the distortion correcting range calculating unit calculates the input image range for next distortion correction processing during executing the distortion correction processing by the distortion correcting unit.

With the configuration, the input image range for the next distortion correction is calculated during executing the distortion correction. Therefore, upon ending the distortion correction of one block line, the input image range for the next distortion correction is known and the distortion of the next block line is sequentially and smoothly corrected.

According to the present invention, in an image processing method for distortion correction processing, an input image range for distortion correction processing is calculated at the time of the distortion correction processing.

As mentioned above, the input image range for distortion correction processing is calculated at the time of the distortion correction processing, thereby calculating the sizeable proportional range of the region corresponding to a part or the entire output range of the image after the distortion correction processing to the input image. The corrected image obtained by the distortion correction processing can be outputted without overs and shorts for the image output range. The over/shortage of the corrected image against the image output range is prevented.

According to the present invention, in an image processing apparatus comprising a distortion correcting unit for correcting distortion of image data, the distortion correcting unit calculates the spatial position on the image pickup surface based on a describable coordinate system, upon calculating positions of pixels in the image before the distortion correction processing corresponding to pixels of a corrected image by using a predetermined correcting formula.

With the configuration, in the image data before the correction, the position corresponding to the pixels of the corrected image is calculated based on the coordinate system, as the reference, (i.e., position in the two-dimensional space) corresponding to the image pickup surface.

Preferably, the distortion correcting unit performs the distortion correction processing of the image data in units of a first small region included in the corrected image, transforming the position on the coordinate system corresponding to the image pickup surface, of a second small region on the image pickup surface including the small region obtained by transformed by the coordinate position of the first small area of the pixels in the first small region in accordance with the correcting formula, into the coordinates in the second small region. After that, the data of the pixels in the corrected image is generated.

With the configuration, the interpolation is performed based on the coordinates in the transformed small region.

Incidentally, the image data may be partial image data obtained by storing a part of the image pickup data.

The image data may not be all image pickup data, but a part of the data, e.g., data obtained by cutting-out the central portion of the image pickup data in the digital zoom operation, or reduction data generated by thinning-out the image pickup data.

Further the image data may be data generated by performing at least one of filtering, spatial sampling, and interpolation on the image pickup data.

The image data may include data obtained by filtering for frequency limitation, proper sampling from the two-dimensional space, e.g., the image pickup surface of an image pickup device, or interpolation (processing for generating the pixel between pixels discreted due to sampling processing based on the estimation from the peripheral pixels).

According to the present invention, a distortion correcting method of an image processing apparatus comprising a distortion correcting unit for correcting distortion of image data, comprises: generating a first position on a coordinate system corresponding to each pixel of a corrected image; transforming the first position into a second position on a coordinate system in the image data before the distortion correction processing in accordance with a distortion correcting formula; transforming the second position on the coordinate system in the image data before the distortion correction processing into a coordinate in a setting region having a coordinate system corresponding to an image pickup surface, as the reference; and generating data of the pixels of the corrected image by interpolation based on the coordinate in the setting region.

With the distortion correcting method, upon obtaining data of pixels of the corrected image by a correcting formula for correcting the geometric distortion due to an image pickup lens, the first position on the coordinate system corresponding to the pixels of the corrected image is transformed into the second position on the coordinate system in the image data before the distortion correction processing in accordance with the distortion correcting formula, the transformed second position is transformed into the coordinate within the setting range having the coordinate system corresponding to the image pickup surface, as the reference, and the image data is interpolated based on the coordinates, thereby generating the pixel data of the corrected image.

Preferably, the image data is processed in units of small region included in the corrected image.

With the image processing method, the processing is performed in units of small region included in the corrected image (e.g., region that is referred to as a block line).

According to the present invention, an image processing apparatus comprises a distortion correcting unit for correcting distortion of image data. In the image processing apparatus, the distortion correcting unit comprises a memory unit that partly stores the image data and a memory control unit that controls the writing and reading operation of data to/from the memory unit, and an interpolation calculation is performed on the image data read from the memory unit.

With the configuration, the image data is partly stored in the memory unit, serving as an inner buffer, and the interpolation calculation for distortion correction processing is performed by using the data.

Preferably, the memory control unit controls the writing operation in units of image data (unit line: UL) comprising a constant number of pixels aligned in one column in the column direction upon writing the data to the memory unit, and further controls the reading operation of the image data stored in the memory unit such that the image after the distortion correction processing is outputted in units of UL, upon reading the data from the memory unit.

With the configuration, the data is written and read to/from the memory unit in units of UL. Thus, it is sufficient to provide the buffer capacity of the memory unit corresponding to at least the capacity corresponding to one UL. The distortion can be corrected without increasing the amount of transfer data through the bus or the capacity of memory.

Further, preferably, the memory control unit has areas (preULB and postULB) with a predetermined width on the front and back sides of the coordinate position of the pixel in the UL, first-processed, in the row direction, and controls the operation for preventing the overwriting of the region by another processing during the processing of the UL.

With the configuration, it is ensured to prevent the overwriting of the data of the areas preULB and postULB of the memory unit, serving as a buffer necessary for processing.

Preferably, the image processing apparatus further comprises a buffer free capacity monitoring circuit that detects a buffer free capacity, wherein the buffer free capacity monitoring circuit detects a free area in the buffer and then can write data to the free area.

With the configuration, the pipeline operation, in which the data can be inputted during outputting the data, is possible.

Preferably, the memory unit comprises a plurality of memories that can simultaneously perform the reading operation and the writing operation of data. The memory control unit further comprises a write-address generating circuit that controls the writing operation of data to the memory unit and a read-address generating circuit that generates an address for simultaneously reading data necessary for the interpolation calculation from the image data stored in the memory unit. The simultaneously-read data is written to different memories by the data writing control.

With the configuration, information of a plurality of pixels (e.g., 16 pixels) around an arbitrary coordinate is simultaneously read, as data necessary for interpolation calculation, from the image data in the buffer, thereby performing the calculation fast.

According to the present invention, in an image processing method for correcting distortion of image data, in the distortion correction processing, the image data is partly stored in a memory unit which is controlled for writing and reading operation of data, and the image data read from the memory unit is subjected to the interpolation calculation.

With this method, the image data is partly stored in the memory unit, serving as the inner buffer, and the interpolation calculation can be executed for distortion correction processing by using the stored data.

BRIEF DESCRIPTION OF THE DRAWINGS

FIG. 3 is a diagram showing image pickup data, FIG. 4 is a diagram showing the corrected image, and FIG. 5 is an explanatory diagram for interpolation;

FIG. 12 is a diagram showing a range of the corrected image, and FIG. 13 is a diagram showing a range of the original data;

FIG. 23 is a diagram showing the image-pickup data before the processing of the correction, and FIG. 24 is a diagram showing the corrected image after the processing of the correction;

FIG. 26 is a diagram showing the image-pickup data before the processing of the correction, and FIG. 27 is a diagram showing the corrected image after the processing of the correction;

FIG. 28 is a diagram showing the image-pickup data before the processing of the correction, and FIG. 29 is a diagram showing the corrected image after the processing of the correction;

FIG. 30 is an explanatory diagram for the state of thinning-out three longitudinal lines from data in the image pickup operation and of storing the resultant data to a memory in the CCD, and FIG. 31 is a diagram showing the picked-up image data which is stored in the memory, and FIG. 32 is a diagram showing the corrected image of asymmetrical images in the longitudinal and lateral directions;

FIG. 33 is a diagram showing luminance data, and FIG. 34 is a diagram showing the color data;

FIGS. 40 and 41 are explanatory diagrams of the state of writing data to a 2-port SRAM, auxiliarily explaining FIG. 39, FIG. 40 is a diagram showing the writing order, and FIG. 41 is a diagram showing the written position of the data in the writing order shown in FIG. 40 on the 16 pieces of 2-port SRAMs;

FIG. 48 is an explanatory diagram of the definition of areas preULB and postULB, and FIG. 49 is an explanatory diagram of a releasing amount of buffer upon an UL processing crossing the distortion center;

FIG. 59 is a diagram showing the concept of image processing sequence of a general digital camera;

FIG. 60 is a diagram showing the block structure of an image processing apparatus for a conventional digital camera;

DETAILED DESCRIPTION OF THE PREFERRED EMBODIMENT(S)

A description is given of embodiments of the present invention with reference to the drawings.

Figure 1:
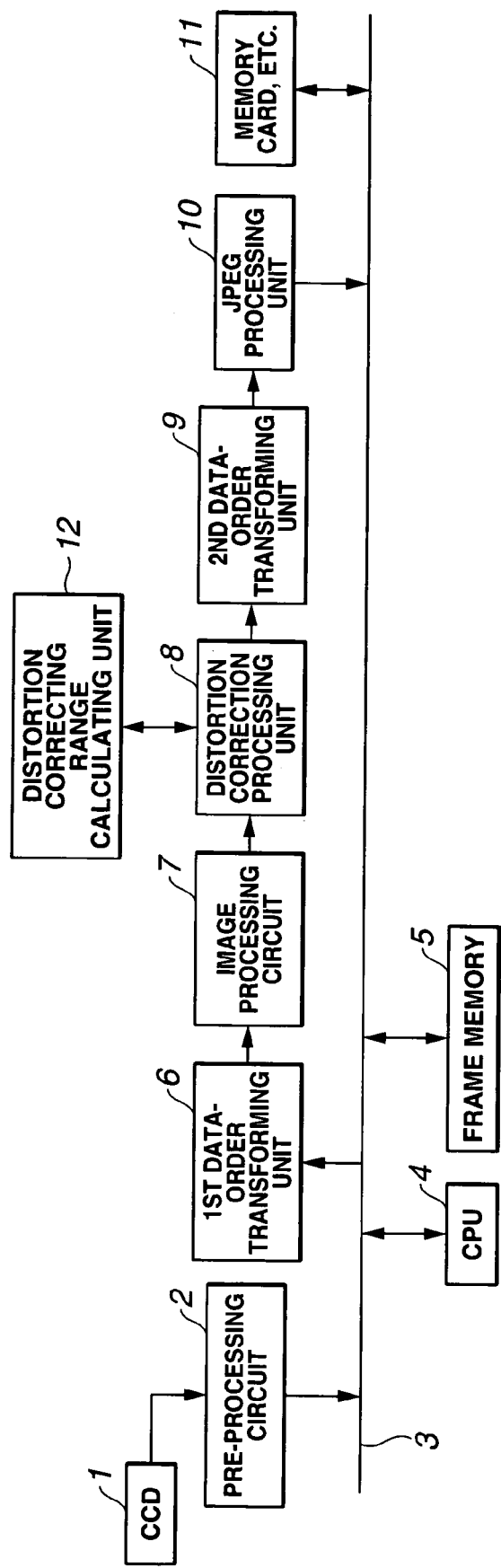
FIG. 1 is a block diagram showing the entire configuration of an image processing apparatus according to a first embodiment of the present invention.

FIG. 1 is a block diagram showing the entire configuration of an image processing apparatus according to a first embodiment of the present invention.

In the image processing apparatus shown FIG. 1, an image pickup signal from a CCD 1 is subjected to pixel defect processing and A/D conversion by a pre-processing circuit 2 under the control of a CPU 4 which controls units connected to a bus 3. The obtained image data is temporarily stored in a frame memory 5 via the bus 3. The frame memory 5 comprises an SDRAM and the like, and stores data before image processing and data after the image processing. Subsequently, the image data read from the frame memory 5 is inputted to a first data-order transforming unit 6 via the bus 3. The first data-order transforming unit 6 comprises a plurality of memories, here, two, which can store data in units of block, as will be described later with reference to FIG. 7. The first data-order transforming unit 6 sequentially reads and stores the data in the row direction from the frame memory 5. Thereafter, the first data-order transforming unit 6 sequentially reads the data in the column direction, and outputs the read data to an image processing circuit 7.

The image processing circuit 7 performs predetermined image processing of the input data, and transfers the processed data to a distortion correction processing unit 8, serving as a subsequent-stage distortion correcting unit. The distortion correction processing unit 8 corrects the distortion of the input data, and transfers the corrected data to a subsequent-stage second data-order transforming unit 9. The second data-order transforming unit 9 comprises a plurality of memories, here, two, which can store data in units of block, as will be described later with reference to FIG. 8. The second data-order transforming unit 9 reads and stores the data in the column direction from the distortion correction processing unit 8. Thereafter, the second data-order transforming unit 9 sequentially reads the data in the row direction and transfers the read data to a JPEG processing unit 10. The JPEG processing unit 10 performs a JPEG-compression of the data, temporarily stores the processed data to the frame memory 5, and records the processed data which is read from the frame memory 5 to a memory card 11.

Figure 2:
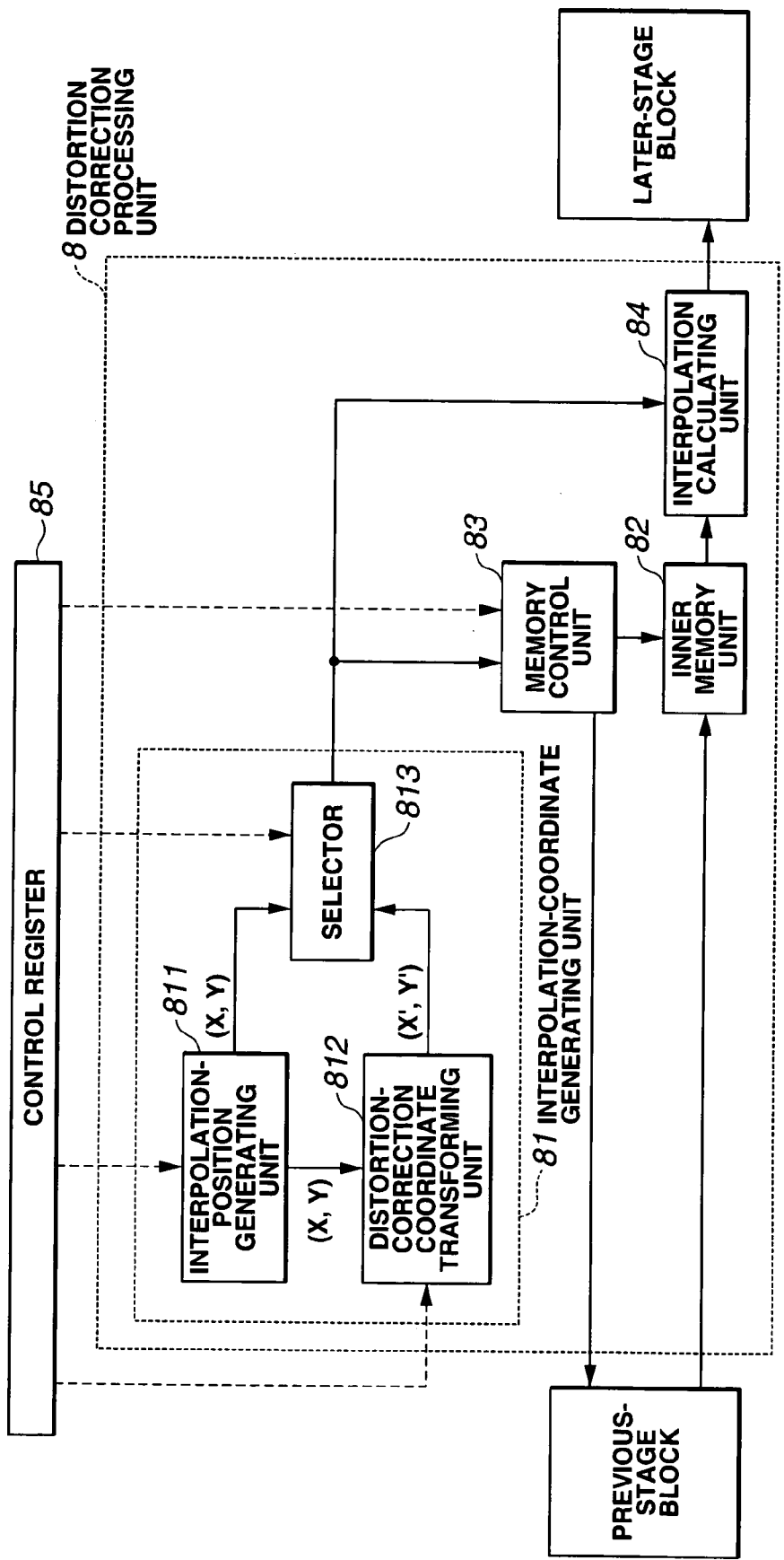
FIG. 2 is a block diagram showing the configuration of a distortion correction processing unit.

Referring to FIG. 2, the distortion correction processing unit 8 comprises: an interpolation-coordinate generating unit 81 which generates a position (X, Y) (referred to as an interpolation position) of the corrected image after the distortion correction processing and a position (X', Y') of the original image before the distortion correction processing corresponding to the position (X, Y); an inner-memory unit 82, serving as a buffer memory (hereinafter, simply referred to as a buffer), which temporarily stores a part of the image data from a previous-stage circuit of the distortion correction processing unit 8; a memory control unit 83 which controls the reading and writing from/to the inner-memory unit 82; and an interpolation calculating unit 84 which performs the image processing in accordance with the position coordinates (X', Y') of the transformed image before the distortion correction processing and corrects the distortion of the data.

Referring to FIG. 2, the interpolation-coordinate generating unit 81 comprises: an interpolation-position generating unit 811 which generates the interpolation coordinates (X, Y); a distortion-correction coordinate transforming unit 812 which outputs the position coordinates (X', Y') of the transformed image before the correction by applying a predetermined distortion correcting formula [Formula 1] (which will be described later) to the generated interpolation coordinates (X, Y); and a selector 813 which can selectively output the interpolation coordinates (X, Y) from the interpolation-position generating unit 811 and transformation coordinates (X', Y') from the distortion-correction coordinate transforming unit 812. The interpolation-position generating unit 811, the distortion-correction coordinate transforming unit 812, the selector 813, and the memory control unit 83 in the distortion correction processing unit 8 are operated in accordance with values relative to blocks set in a control register 85 which stores control data. Further, a status of the processing result is referred to from the CPU.

Referring to FIG. 1, the distortion correction processing unit 8 further comprises a distortion correcting range calculating unit 12 which calculates an input image range, for which the distortion correction processing unit 8 corrects the distortion. As will be described with reference to FIG. 11, the distortion correcting range calculating unit 12 comprises: a coordinate generating unit 91 which generates the interpolation coordinates; a distortion-correction coordinate transforming unit 92 which outputs the coordinates transformed by applying a predetermined distortion correcting formula to the generated interpolation coordinates; and a correcting range detecting unit 93 which calculates the input image range from the transformed coordinate position before the correction.

In the image processing apparatus with the above-mentioned configuration according to the present invention, the units starting from the first data-order transforming unit 6 to the JPEG processing unit 10 are connected for pipeline processing via an information transmitting route different from the bus 3, not via the bus 3, and the image data is transferred and processed in units of predetermined block in the two-dimensional pixel alignment. As mentioned above, the data transfer via the bus 3 includes only the transfer from the frame memory 5 to the first data-order transforming unit 6, the transfer from the JPEG processing unit 10 to the frame memory 5, and the transfer from the frame memory 5 to a memory card 11. Therefore, as compared with the conventional art (refer to FIG. 60) of the data transfer between the frame memory and the image processing circuits, the amount of transferred data via the bus 3 is greatly reduced, and the load to the bus 3 is further reduced. Further, in the example shown in FIG. 1, only one image processing circuit 7 for image processing is provided and, however, a plurality of image processing circuits may be provided. Furthermore, as shown in FIG. 1, the distortion correction processing unit 8 is arranged after the image processing circuit 7 and, however, the contrary configuration of the distortion correction processing unit 8 and the image processing circuit 7 may be used.

The first-stage image-processing-circuit 7 and the distortion correction processing unit 8, serving as the second-stage image processing circuit, form an image processing circuit unit. The image processing circuit unit has memories having a small capacity (not shown), serving as pipeline registers, at the previous-stage of the image processing circuits 7 and 8 or in the image processing circuits 7 and 8, and the image processing circuits 7 and 8 perform the pipeline processing via the small memories. The memories having a small capacity are arranged to store peripheral data necessary for image processing and to read the image data in units of block and change the arrangement of pixels in the spatial image processing in the image processing circuits 7 and 8.

Figures 3, 4:
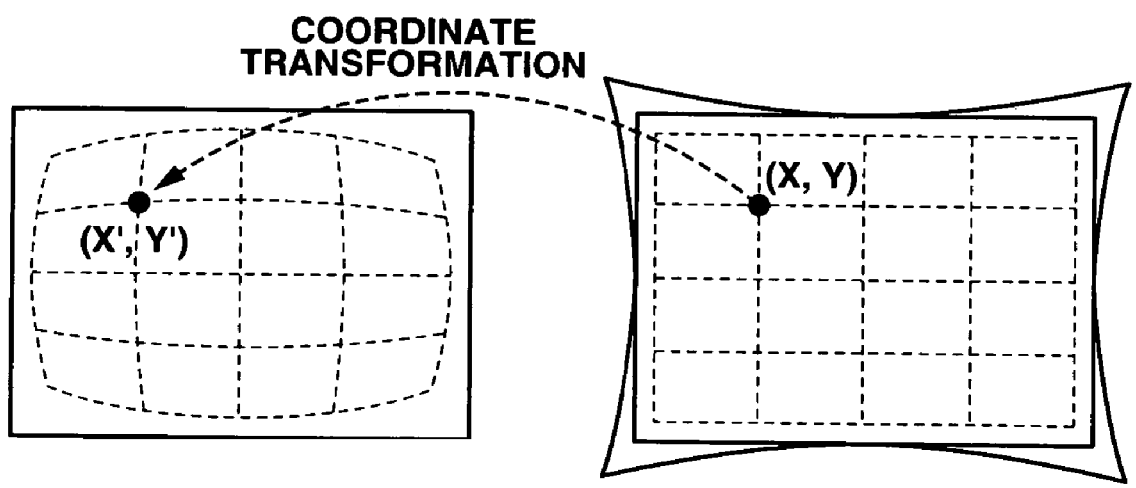
FIGS. 3 to 5 are conceptual diagrams of coordinate transformation in the distortion correction processing unit.
Figure 5:
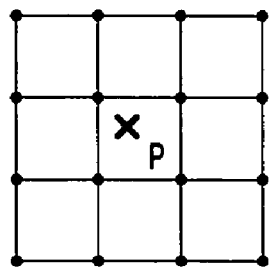

FIGS. 3 to 5 are conceptual diagrams of the coordinate transformation of the distortion correction processing unit 8. FIG. 3 shows the image pickup data, serving as the original data, FIG. 4 shows the corrected image, and FIG. 5 shows the coordinates. (X', Y') of data at a coordinate position P transformed on the coordinates of the original data shown in FIG. 3 from the coordinate position (X, Y) of the corrected image shown in FIG. 4 (the coordinate P accurately does not match positions of a plurality of pixels actually forming the original data). The coordinate position (X', Y') at the point P is calculated by using the coordinates of 16 pixels in the neighborhood of the point P, and the image data at the point P is interpolation-calculated by using data on 16 pixels in the neighborhood of the point P. The interpolation calculating unit 84 processes the data at the point P for the interpolation calculation from values (luminance data) of the 16 pixels in the neighborhood of the positional data at the point P. The interpolation-position generating unit 811 in FIG. 2 generates the interpolation coordinates so as to indicate the pixel position (X, Y) on the corrected-image side shown in FIG. 4.

With [Formula 1], the pixel position (X', Y') before the distortion correction processing relative to the pixel position (X, Y) after the distortion correction processing is calculated. However, the pixel position (X', Y') before the distortion correction processing is not limited to the position having an integer corresponding to the pixel position on the original image data, as mentioned above.

In accordance with [Formula 1], the coordinates (X, Y) shown in FIG. 4 are transformed into the coordinates (X', Y') as shown in FIG. 3. Thus, it is known that data of which coordinate position in the original data is to be generated, and the data at the position (X', Y') is obtained by calculating data of the position (X', Y') from the known values (input image data shown by a solid circle in FIG. 5) of the 16 pixels by using an interpolation formula for performing the 16-pixel interpolation.

[Formula 1] (1)
$$\begin{cases} \hat{X} = M \cdot (X - X_d) + (X_d + X_{off}) \\ \hat{Y} = M \cdot (Y - Y_d) + (Y_d + Y_{off}) \end{cases}$$

$$Z^2 = [S_X \cdot (\hat{X} - X_d)]^2 + [S_Y \cdot (\hat{Y} - Y_d)]^2 \quad (2)$$

$$\begin{cases} X' = (\hat{X} - X_d) \cdot [1 + A \cdot Z^2 + B \cdot Z^4 + C \cdot Z^6 + \ldots] + X_d \\ Y' = (\hat{Y} - Y_d) \cdot [1 + A \cdot Z^2 + B \cdot Z^4 + C \cdot Z^6 + \ldots] + Y_d \end{cases} \quad (3)$$

(X, Y): Coordinates in the corrected image
(X', Y'): Coordinates in the picked-up image
$(X_d, Y_d)$: Distortion center
$(X_{off}, Y_{off})$: Correction of central deviation
M: Correcting range magnification
$(S_X, S_Y)$: Sampling ratio
A, B, C, . . . : Distortion correction coefficient Reference symbol Z in [Formula 1] denotes the distance from the distortion center $(X_d, Y_d)$ to the target point (X, Y). With [Formula 1], the coordinates (X', Y') of the original image having the distortion with respect to the point (X, Y) related to the corrected image are calculated. Supplementally, in [Formula 1], reference symbol M denotes the correcting magnification which corrects the phenomenon for the appearance of unused data or shortage data of the image after the correction in the theoretical correction using the optical system data. Reference symbols $S_x$ and $S_y$ denote the sampling ratio for correcting the phenomenon, such as the thinning-out and storing, having different spatial sampling intervals in the longitudinal and lateral directions. Reference symbols $X_{off}$ and $Y_{off}$ denote the values of the deviation from the center, which corrects the phenomenon, in which the subject position is deviated, due to the distortion correction processing, from the position at the time of image picking-up.

Figure 22:
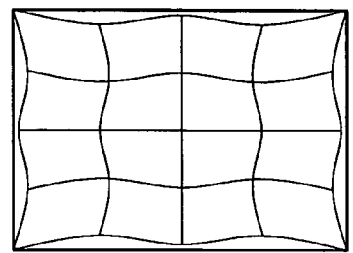
FIG. 22 is a diagram showing a picked-up image with the curvilinear distortion.

In consideration of a high-degree term (specifically, $Z^4$, $Z^6$, . . . ), [Formula 1] according to the present invention can respond to the complicated curvilinear-distortion (refer to FIG. 22). Further, if the centers match but the data of an image pickup element is partly stored or if the center of the optical axis is deviated from the center of the image pickup element, the distortion center $(X_d, Y_d)$ needs to be considered. Further, in order to correct the phenomenon in which the subject position is deviated, due to the distortion correction processing, from the position in the photographing, the corrected values $(X_{off}, Y_{off})$ of the central deviation need to be considered. In the thinning-out and storing or the processing of a YC image comprising luminance data (Y) and color data (Cb, Cr), the spatial sampling varies depending on values X and Y. Then, the sampling ratio $(S_x, S_y)$ is introduced, as coefficient, and the coordinate transformation is corrected.

Figure 61:
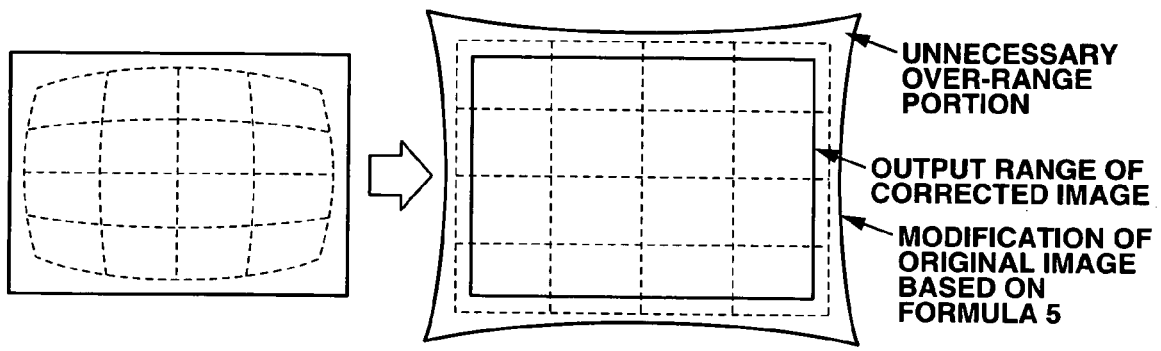
FIG. 61 is an explanatory diagram of the operation for correcting the picked-up image having the barrel distortion using [Formula 5]
Figure 62:
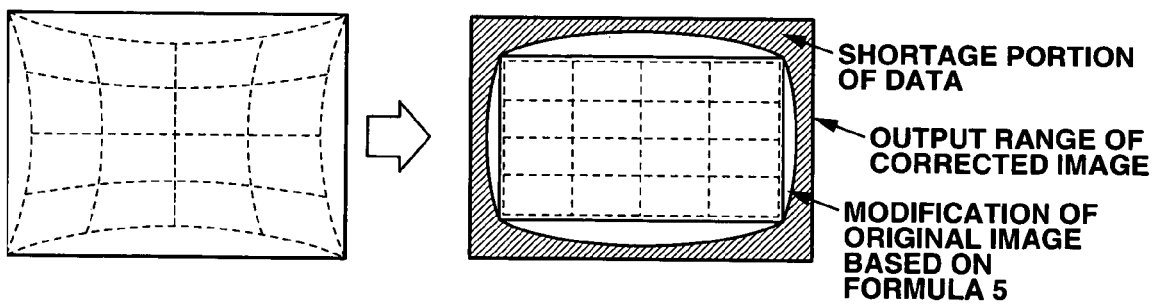
FIG. 62 is an explanatory diagram of the operation for correcting the pincushion distortion using [Formula 5].

In order to correct the barrel distortion shown in FIG. 61, M<1 is set to slightly reduce the image. On the contrary, in the case of the pincushion distortion shown in FIG. 62, the image is expanded and, therefore, M>1 is set.

In [Formula 5] described according to the conventional art, the description is given in consideration of correction of the barrel distortion and the pincushion distortion.

Figure 6:
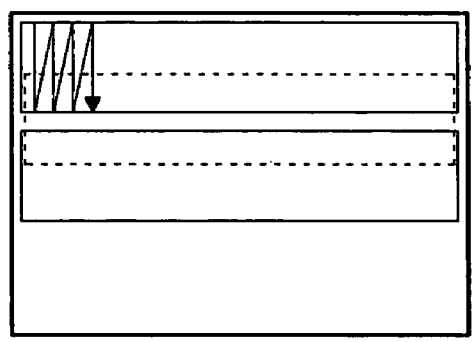
FIG. 6 is a diagram showing the reading sequence of the image data.
Figure 7:
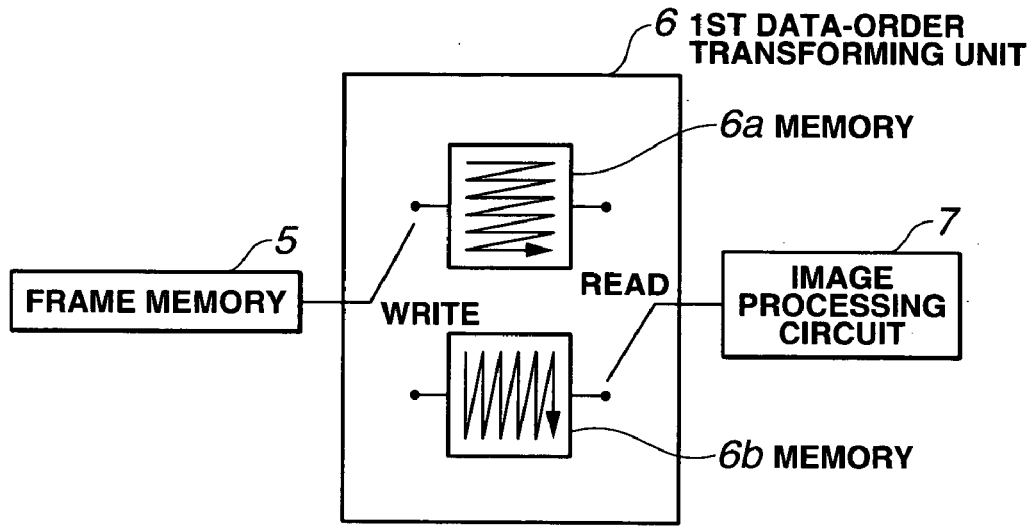
FIG. 7 is an explanatory diagram for data-order transformation processing in a first data-order transforming unit.
Figure 8:
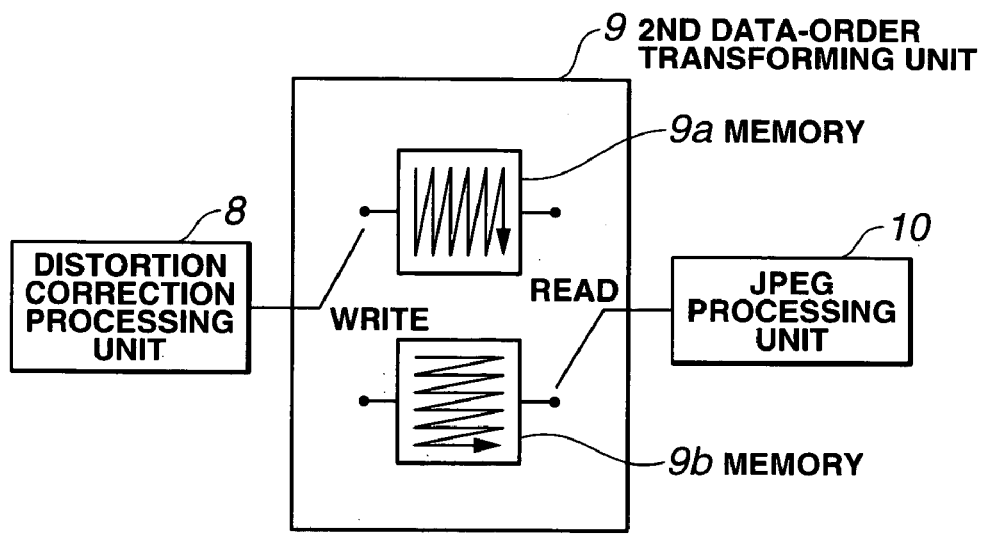
FIG. 8 is an explanatory diagram for data-order transformation processing in a second data-order transforming unit.

Next, a description is given of the writing and reading processing and sequence of the image data with reference to FIGS. 6 to 8.

FIG. 6 is an explanatory diagram of the reading sequence of the image data from the frame memory according to the first embodiment.

Normally, the image data is generally written to be swept in the line direction, i.e., in the row direction, the image data is read in the row direction in the reading operation, all image data on one line is read, and all image data on the next adjacent line is read. In general, the above-mentioned operation is repeated.

On the other hand, in the image processing apparatus according to the present invention, the image data swept and written in the row direction is sequentially inputted to the image processing unit 7 in units of a predetermined length in the column direction. Subsequently, the adjacent columns are sequentially inputted to the image processing unit 7 and the image data up to the right end thereof is repeatedly inputted. The above-obtained small region (rectangular image data) is referred to as a block line (BL).

With reference to FIGS. 7 and 8, a description is given of the configuration of the first data-order transforming unit 6 and the second data-order transforming unit 9 which read the image data. FIGS. 7 and 8 are diagrams showing the configuration of the first and second data-order transforming units.

Referring to FIG. 7, the first data-order transforming unit 6 comprises a plurality of memories, here, two, which can store image data in units of block, i.e., two memories 6a and 6b which can alternately switch the reading and writing operation by switches on the writing and reading sides. In other words, the frame memory 5 is connected to the memories 6a and 6b to be switchable by the switch on the writing side, and the image processing unit 7 is connected to the memories 6a and 6b to be switchable by the switch on the reading side. When the frame memory 5 is connected to one of the memories 6a and 6b, the other memory of the memories 6a and 6b is switched to be connected to the image processing unit 7. In other words, the memories 6a and 6b are switched so as to prevent the simultaneous connection to the frame memory 5 and the image processing unit 7, thereby alternately performing the writing operation and the reading operation.

A frame image stored in the frame memory 5 is partly read in the line direction in units of block, and is stored in one of the memories 6a and 6b, e.g., the memory 6a here.

In parallel therewith, the image data in units of block, which has already been read from the frame memory 5 and been stored, is sequentially read from the memory 6b in the column direction (in the longitudinal direction) and is outputted to the image processing unit 7.

Upon ending the writing operation from the frame memory 5 to the memory 6a and the reading operation from the memory 6b to the image processing unit 7, the switch on the writing side and the switch on the reading side are switched. Then, the writing operation of the next image data in units of block from the frame memory 5 to the memory 6b starts and the reading operation of the image data in units of block from the memory 6a to the image processing unit 7 starts.

Referring to FIG. 8, the second data-order transforming unit 9 has the same configuration as that of the first data-order transforming unit 6, and operates similarly to the first data-order transforming unit 6.

In other words, the second data-order transforming unit 9 comprises memories 9a and 9b, a switch on the writing side, and a switch on the reading side.

In the operation of the second data-order transforming unit 9, the writing operation from the distortion correction processing unit 8 to one of the memories 9a and 9b is performed in the column direction (in the longitudinal direction), the reading operation from the other memory of the memories 9a and 9b in the row direction (in the lateral direction) is performed, and the image data is outputted to the JPEG processing unit 10.

Figure 9:
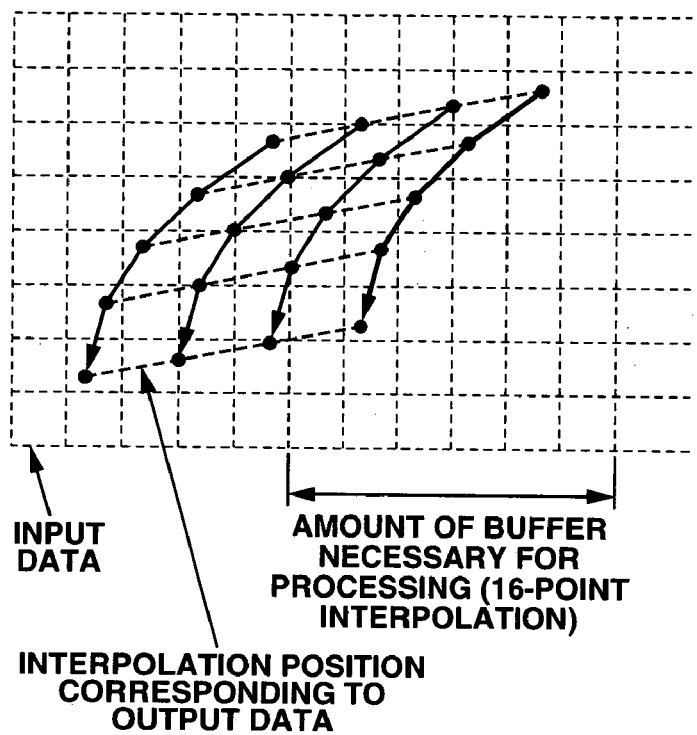
FIG. 9 is a diagram showing a relationship between a block line and a memory capacity (buffer capacity) necessary for distortion correction processing.

FIG. 9 shows a relationship between a block line and memory capacity (buffer capacity) necessary for the distortion correction processing. Four solid lines distorted on a dotted frame must be data, as a straight line (one line in the longitudinal direction) on the output data after the distortion correction processing. However, the four solid lines are distorted on the original data. Among the four straight lines, the straight line at the left end, apart from the center of the image, is most distorted. A solid circle denotes the position before the distortion correction processing corresponding to the pixel position of the output data after the distortion correction processing. In the inner-memory unit 82, a range having margin areas on the left and right in consideration of 16-point interpolation is set to the width in the lateral direction, with which the distorted input data after the image pickup has the maximum amount of distortion in the block line, and is ensured as the buffer capacity necessary for the distortion correction processing. In other words, the above-mentioned buffer capacity enables the distortion correction processing, i.e., enables the formation of the proper linear image as a result of the distortion correction processing.

Figure 10:
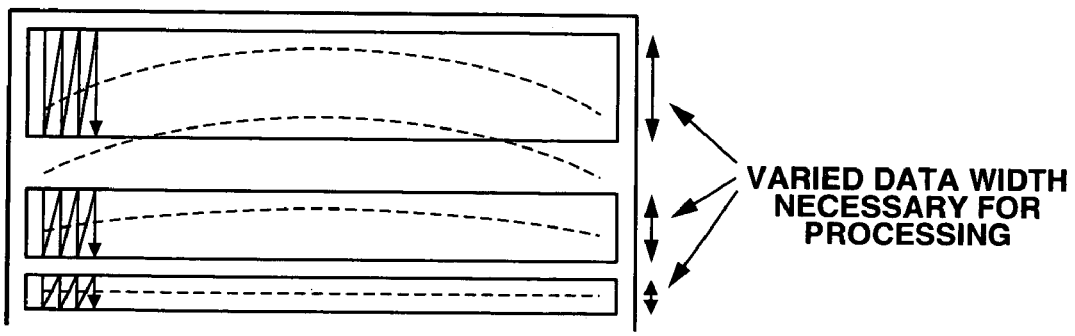
FIG. 10 is a diagram showing a method of setting the width of block line.

FIG. 10 shows a setting method of the width of block line. Referring to FIG. 10, an example of varying the width of block line depending on the target position of the distortion correction processing is shown. A bent broken line denotes the data with the distortion on the input side having a larger degree of distortion as the position is apart i.e., further from the center of the image, that is, the position is near the outside. Therefore, upon setting the width of block line to the input data on the frame memory, the width is larger as the position is apart i.e., further from the center of the image, and the width is smaller as the position is near the center of the image. Thus, upon transferring the data to the image processing circuit from the frame memory 5 via the bus 3, if the data width is smaller, the time using the bus is short.

In general, the amount of modification due to the distortion is smaller near the center of the image. Depending on the position of the processing target of the distortion correction processing, the setting value of the width of block line (sweeping width in the longitudinal direction in the drawing) is changed. Since [Formula 1] includes a high-degree term, the input range necessary for the processing of the block line cannot be analytically found. The width of block line is set based on the processing result of the distortion correcting range calculating unit 12 and the CPU performs predetermined calculation based on the result.

Figure 11:
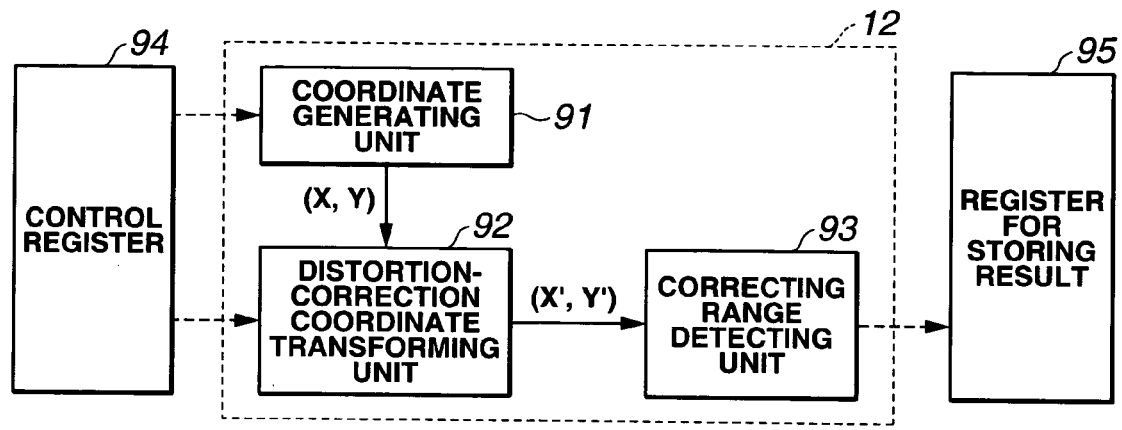
FIG. 11 is a block diagram showing the configuration of a distortion correcting range calculating unit.

FIG. 11 shows the configuration of the distortion correcting range calculating unit 12. The distortion correcting range calculating unit 12 comprises: the coordinate generating unit 91 which generates the interpolation coordinates (X, Y); the distortion-correction coordinate transforming unit 92 which outputs the coordinate (X', Y') which is obtained by transforming the generated interpolation coordinate (X, Y) in accordance with a predetermined distortion correcting formula (e.g., [Formula 1]); and the correcting range detecting unit 93 which calculates the input image range necessary for the distortion correction processing from the transformed coordinate position (X', Y') before the correction. As mentioned above, the distortion correcting range calculating unit 12 comprises the coordinate generating unit 91, the distortion-correction coordinate transforming unit 92, and the correcting range detecting unit 93, the CPU 4 controls the operation of the distortion correcting range calculating unit 12 via a control register 94, and the calculating result of the range by the distortion correcting range calculating unit 12 is obtained by a register 95 connected to the CPU. The distortion correcting range calculating unit 12 is added to the distortion correcting function, and operates as a supporting function for calculating the input range of the image data in consideration of the modification of distortion.

Figure 12:
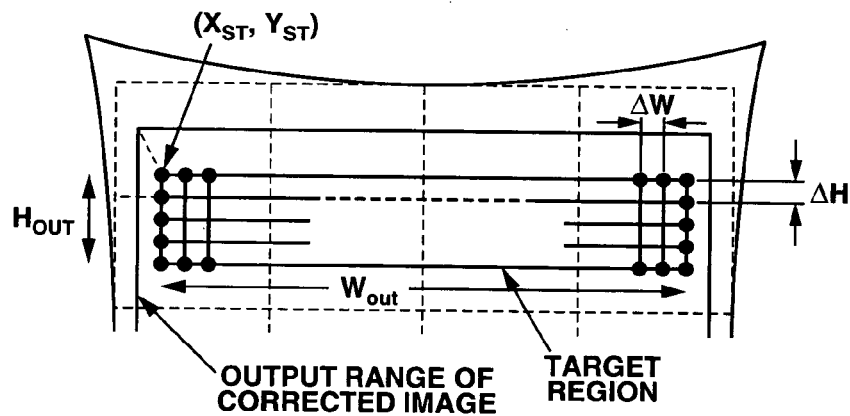
FIGS. 12 and 13 are explanatory diagrams of the operation for calculating an input image range in the distortion correction processing by a distortion correcting range calculating unit.
Figure 13:
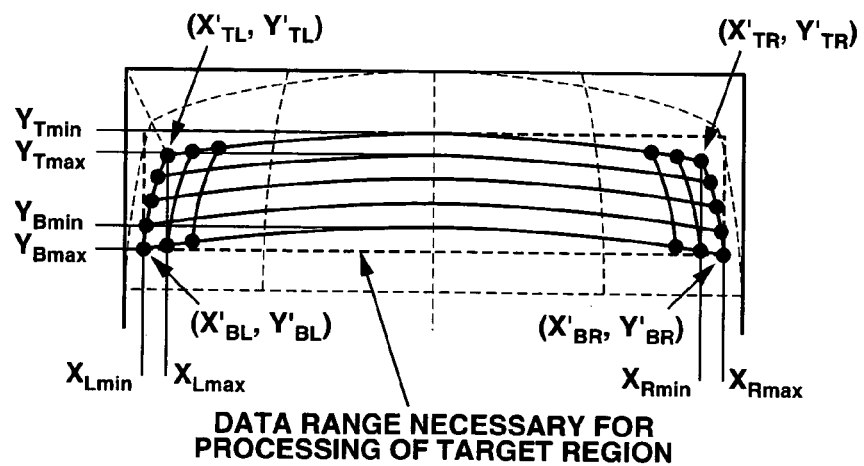

Next, a description is given of the operation for calculating the input image range necessary for the distortion correction processing in the distortion correcting range calculating unit 12 with reference to FIGS. 12 and 13.

The range is designated within the corrected image, and the position is subjected to the coordinate transformation on the input image. First, referring to FIG. 12, the pixel position (grid position) within a predetermined range (e.g., corresponding to five rows) on the corrected image is determined, and the original data on the input side is subjected to the coordinate transformation with [Formula 1], as shown in FIG. 13, thereby the input image range of the data corresponding to five rows on the data on the output side is known. The processing is set by register setting of hardware. On the corrected image in FIG. 12, for example, the start point is a point ($X_{st}$, $Y_{st}$) and the grid point is generated in the order of intervals $\Delta W$ and $\Delta H$. Then, some points are obtained in the longitudinal direction and some points are obtained in the lateral direction, pixels $H_{out}$ in the longitudinal direction and pixels $W_{out}$ in the lateral direction are obtained. As a result of transformation to a position on the original data, the intersection coordinates corresponding to the grid point of the corrected image are generated on the distorted line. However, the distorted range corresponding to the block line, i.e., a circumscribed thick-broken line in the drawing may be known as an input image range (FIG. 13). Actually, as shown by the solid circles in FIGS. 12 and 13, the coordinates of the solid circles on the four peripheral sides forming rectangle are traced, thereby knowing the input image range based on the maximum value and the minimum value of the four sides for prescribing the position range. For example, data having the upper side being between $Y_{Tmax}$ and $Y_{Tmin}$, the lower side between $Y_{Bmax}$ and $Y_{Bmin}$, the left side between $X_{Lmax}$ and $X_{Lmin}$, and the right side within between $X_{Rmax}$ and $X_{Rmin}$ is actually detected, and is stored in the register 95 for storing a result. The processing of the block line needs the range obtained by adding the pixel necessary for the interpolation to ($X_{Lmin}$ to $X_{Rmax}$, $Y_{Tmin}$ to $Y_{Bmax}$). Incidentally, referring to FIG. 13, the positions of the vertexes after the transformation on the original data on the input side are designated by ($X'_{TL}$, $Y'_{TL}$), ($X'_{TR}$, $Y'_{TR}$), ($X'_{BL}$, $Y'_{BL}$), and ($X'_{BR}$, $Y'_{BR}$).

The coordinate generating unit 91 generates the coordinate position (X, Y) necessary for the corrected image in [Formula 2], and transforms the generated coordinate position (X, Y) into the coordinate position (X', Y') in [Formula 1]. The modifying range of the upper side is $Y_{Tmin}$ to $Y_{Tmax}$, the modifying range of the lower side is $Y_{Bmin}$ to $Y_{Bmax}$, the modifying range of the left side is $X_{Lmin}$ to $X_{Lmax}$, and the modifying range of the right side is $X_{Rmin}$ to $X_{Rmax}$. The positions of the vertexes after the transformation are ($X'_{TL}$, $Y'_{TL}$), ($X'_{TR}$, $Y'_{TR}$), ($X'_{BL}$, $Y'_{BL}$), and ($X'_{BR}$, $Y'_{BR}$). The modifying ranges and the positions are detected by the correcting range detecting unit 93, and are stored in the register 95 for storing a result.

$$\begin{cases} X = X_{ST} + k \cdot \Delta W \\ Y = Y_{ST} + l \cdot \Delta H \end{cases} \quad \text{[Formula 2]}$$

where k and l denote integers.

Figure 14:
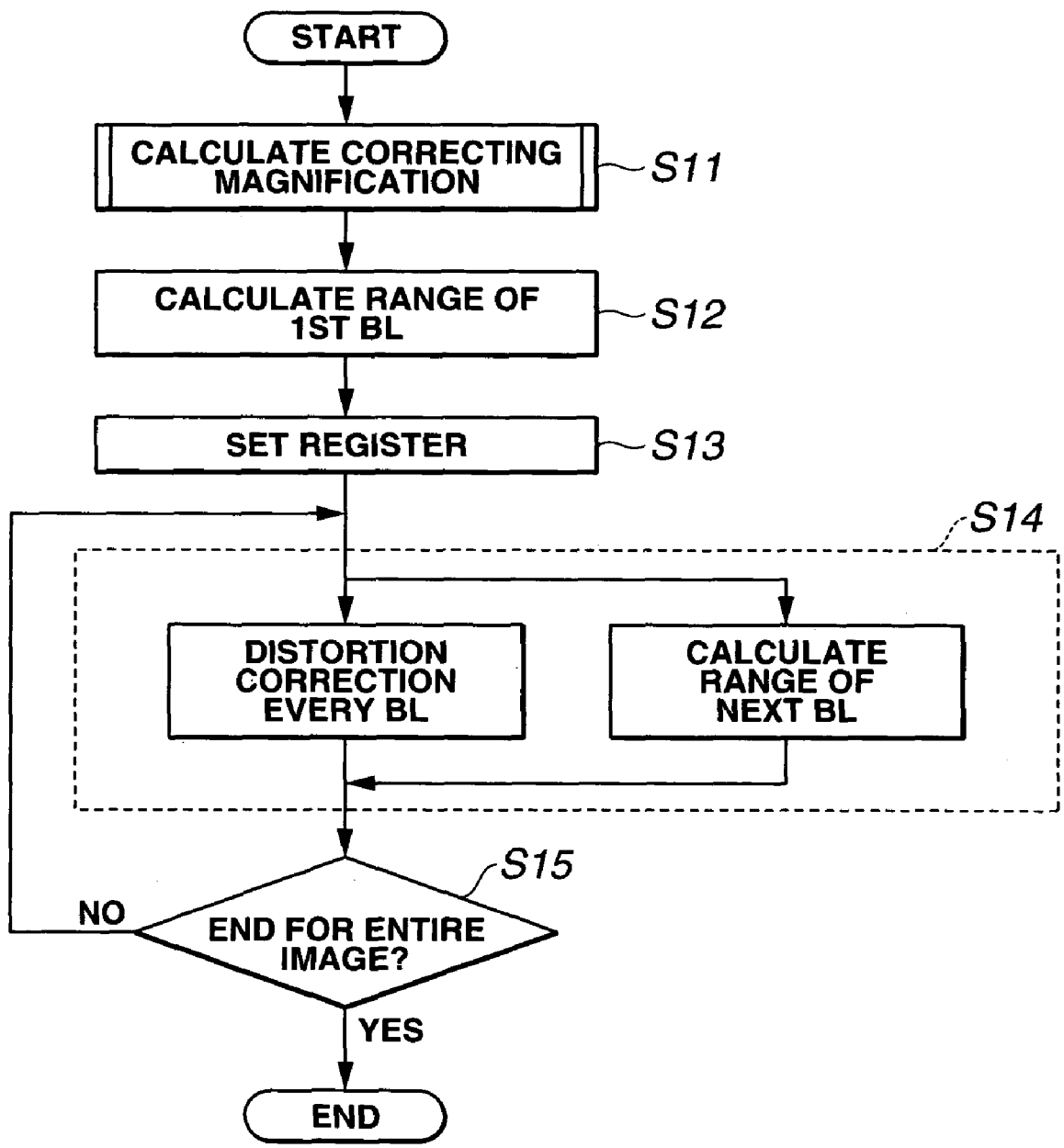
FIG. 14 is a flowchart for explaining the operation of distortion correction processing.

FIG. 14 is a flowchart for explaining the operation of distortion correction processing. In step S11, the correcting magnification M in [Formula 1] for distortion correction is determined. The determination method of the correcting magnification M will be described later with reference to a flowchart in FIG. 15. In step S12, by using the determined correcting magnification M, the input range necessary for the processing of the block line is calculated in consideration of the part necessary for the interpolation, as described above with reference to FIGS. 10 to 13. In step S13, the calculated input range and the setting value necessary for the distortion correction processing are set. In step S14, the distortion correction processing of every block line and the calculation of the input range of the next block line are simultaneously executed. After that, until correcting the distortion of the block line on the most down stage of the image, the distortion correction processing of every block line and the calculation of the input range of the next block line are executed. In step S15, it is determined whether or not the distortion correction processing for all output images ends, thereby repeating step S14. The processing continues until ending the distortion correction processing of the entire image, and then ends.

Thus, upon ending the distortion correction processing of one block line during executing the distortion correction processing, the input image range for next distortion correction processing is calculated. Therefore, upon ending processing of one distortion correction, the input image range of the next distortion correction processing is known. The distortion correction processing of the next block line is sequentially and smoothly performed without the delay.

In step S11, the correcting magnification M is properly determined, thereby setting the image within the image output range even in the image correction of any of the barrel distortion and the pincushion distortion as described above with reference to FIGS. 61 and 62.

Figure 15:
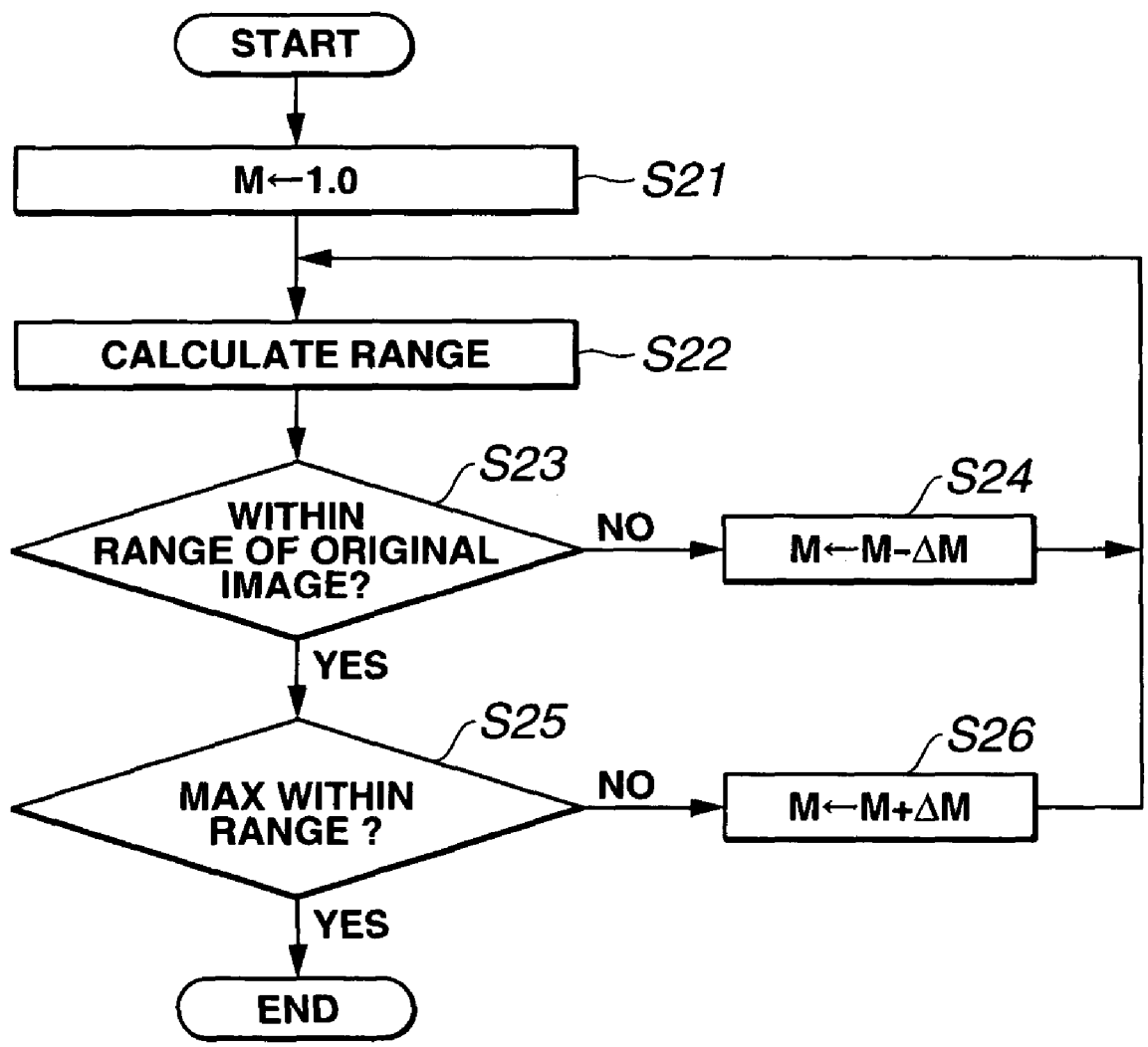
FIG. 15 is a flowchart for explaining a calculating method of a correcting magnification M in step S11 in FIG. 14.

FIG. 15 is a flowchart for explaining a calculating method of the correcting magnification M in step S11 in FIG. 14. In step S21, the initial value of the correcting magnification M is set to 1.0. Subsequently, the four sides of the output image are subjected to the coordinate transformation by using the correcting magnification M and [Formula 1] for distortion correction so that the distortion correcting range calculating unit 12 calculates the input image range (in step S22). It is determined whether or not the image is within the range of the original image (in step S23). When the image goes over the output range as shown in FIG. 61 in step S23, the correcting magnification M is reduced by $\Delta M$ (in step S24). After that, the processing routine returns to step S22 whereupon the input image range is calculated and the determination of the range in step S23 is executed again. In other words, the correcting magnification M changes little by little and it is determined in step S23 whether or not the image is within the range of the original image. When the image is within the range of the original image, the processing routine shifts to step S25. In step S25, it is determined whether or not the input image range is the maximum correcting magnification M within the range of the original image. When the input image range is not the maximum correcting magnification M within the range of the original image, the correcting magnification M is increased by $\Delta M$ (in step S26). After that, the processing routine returns to step S22 and then the processing shifts to steps S23 to S26. When it is determined in step S25 that the correcting magnification M is the maximum one within the range of the original image, the correcting magnitude M in this case is determined as the correcting magnification. In this case, the region used for range calculation corresponds to the entire corrected image.

Incidentally, the flow in FIG. 15 may be executed by another method. For example, a maximum value $M_{max}$, and a minimum value $M_{min}$ of the correcting magnification M are set, the range from $M_{max}$ to $M_{min}$ is sequentially divided to two parts, and the best correcting magnification M is obtained by the narrowing method. Then, the amount of calculation is small.

In step S14 in FIG. 14, the amount of calculation of the range by the distortion correcting range calculating unit 12 is smaller than the amount of calculation for correction by the distortion correction processing unit 8. Then, a multiplier for correction calculation is used on the time-series, thereby reducing the circuit scale.

In the distortion correction processing, as will be understood with reference to [Formula 1], the circuit scale is excessively large in hardware because of an excessively large amount of multiplications. In general, the multiplier increases the circuit scale of hardware and therefore it is preferable to reduce the number of multipliers as much as possible. A multiplier control unit is arranged to control the multiplier and the data is processed at a proper timing with the pipeline processing, thereby reducing the circuit scale without the reduction of the entire processing speed.

Figure 16:
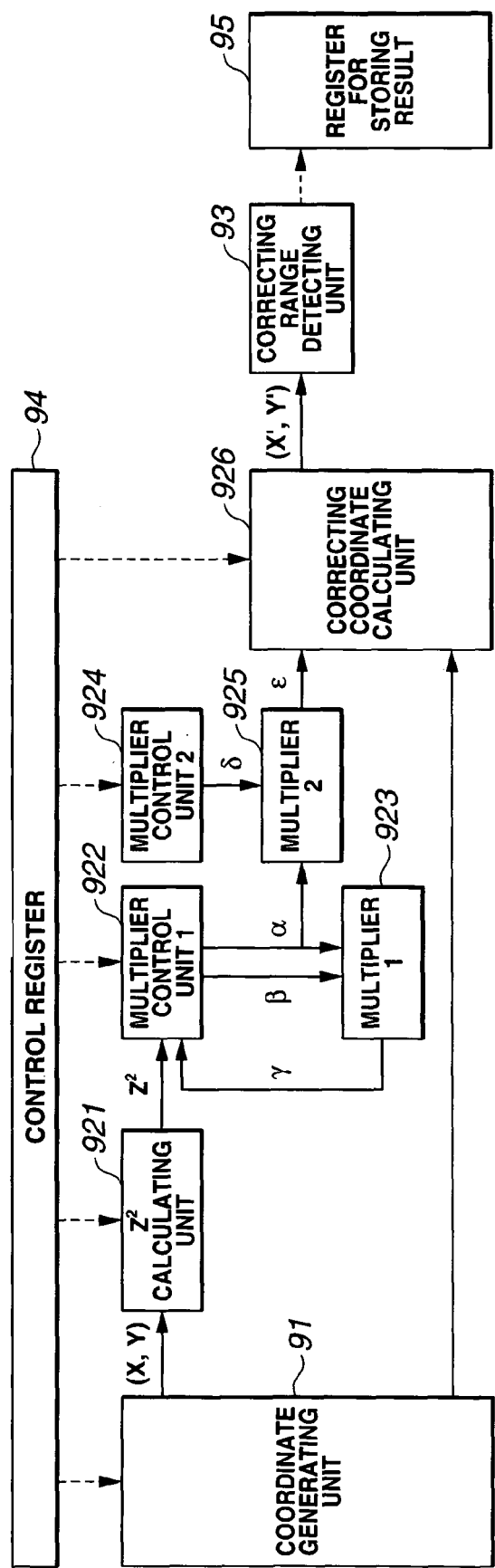
FIG. 16 is a block diagram showing the configuration of the distortion correcting range calculating unit shown in FIG. 11.

FIG. 16 shows the specific configuration of the distortion-correction coordinate transforming unit 92 shown in FIG. 11. Other portions are the same as those shown in FIG. 11. The distortion-correction coordinate transforming unit 92 calculates the data with a large amount of multiplications like [Formula 1]. A plurality of multiplying times in this case are processed on time-series at the proper timing, thereby reducing the number of multipliers.

The distortion-correction coordinate transforming unit 92 comprises: a $Z^2$ calculating unit 921 which inputs the interpolation coordinates (X, Y) from the coordinate generating unit 91 and calculates $Z^2$ by the calculation of (2) in [Formula 1]; a multiplier control unit 922 which inputs $Z^2$ from the $Z^2$ calculating unit 921 and γ from a multiplier 923 and outputs α and β; the multiplier 923 which inputs α and β and outputs γ; a multiplier control unit 924 which outputs δ corresponding to either of correcting coefficient A, B, or C, . . . ; a multiplier 925 which inputs α and δ and outputs ε corresponding to the product of the correcting coefficient and the integral multiple of Z; and a correcting coordinate calculating unit 926 which inputs ε from the multiplier 925 and the interpolation coordinates (X, Y) from the coordinate generating unit 91 and outputs the coordinate (X', Y') of the original data before the correction.

Figure 17:
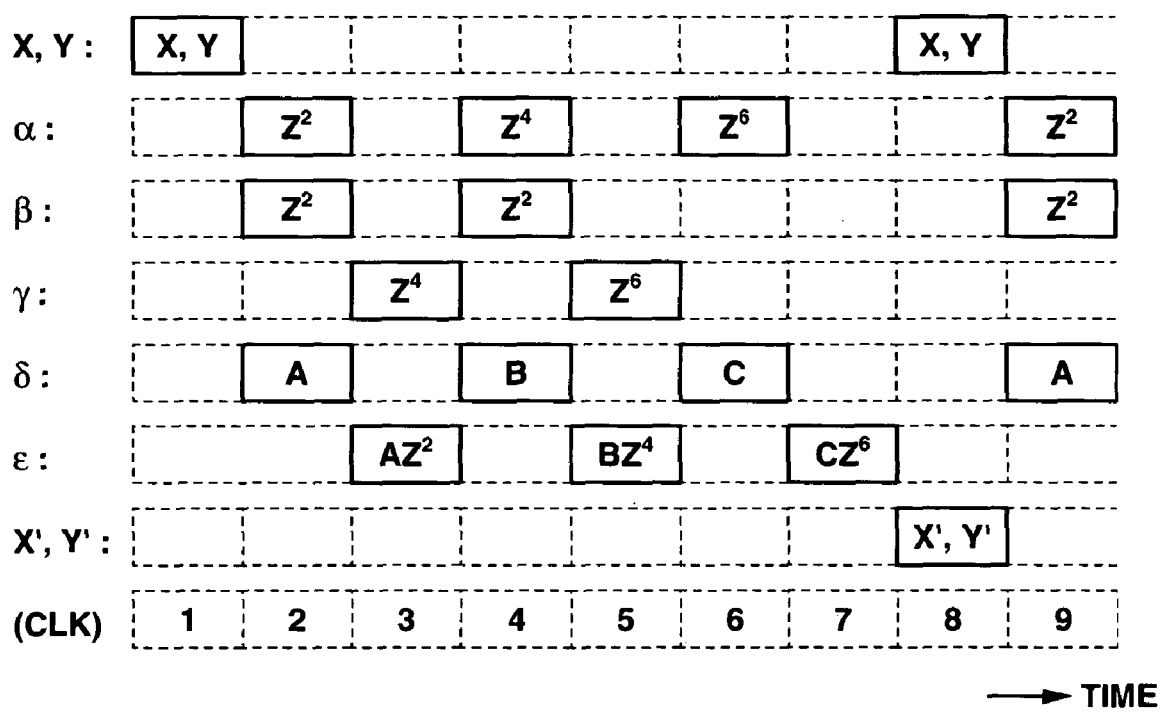
FIG. 17 is a timing chart of data output shown in FIG. 16.

FIG. 17 shows a timing chart of the data output in FIG. 16. First, the $Z^2$ calculating unit 921 inputs the interpolation coordinates (X, Y) at the timing of a clock CLK "1". Subsequently, the multiplier control unit 922 outputs $Z^2$ as α and β, at the timing of a clock CLK "2". The multiplier control unit 924 outputs, as δ, a distortion correcting coefficient A at the same timing of clock CLK "2". At the timing of a next clock CLK "3", the multiplier 923 outputs $Z^4$ as γ based on α and β to be inputted. The multiplier 925 outputs $AZ^2$ as ε at the same timing of the clock CLK "3" based on α and δ to be inputted. Similarly, at the timings of clock CLKs "4" and "5", values B and $BZ^4$ are obtained as δ and ε. At the timings of clock CLKs "6" and "7", values C and $CZ^6$ are obtained as δ and ε. As a consequence, at the timing of a clock CLK "8", the coordinate position (X', Y') of the original data relative to the interpolation coordinates (X, Y) is outputted from the correcting coordinate calculating unit 926.

In the configuration shown in FIG. 16, the number of multipliers is two, but the calculation corresponding to 6 multipliers is executed by using the multiplier on time-series. Consequently, the number of multipliers is reduced to ⅓. Further, the same operation may be used even in consideration of a high-degree term.

Referring to a timing chart shown in FIG. 17, in the coordinate transformation for distortion correction, the output data of variables for each clock has a time interval (space). However, the pipeline processing enables the continuous output of the data of the variables without the time interval.

Figure 18:
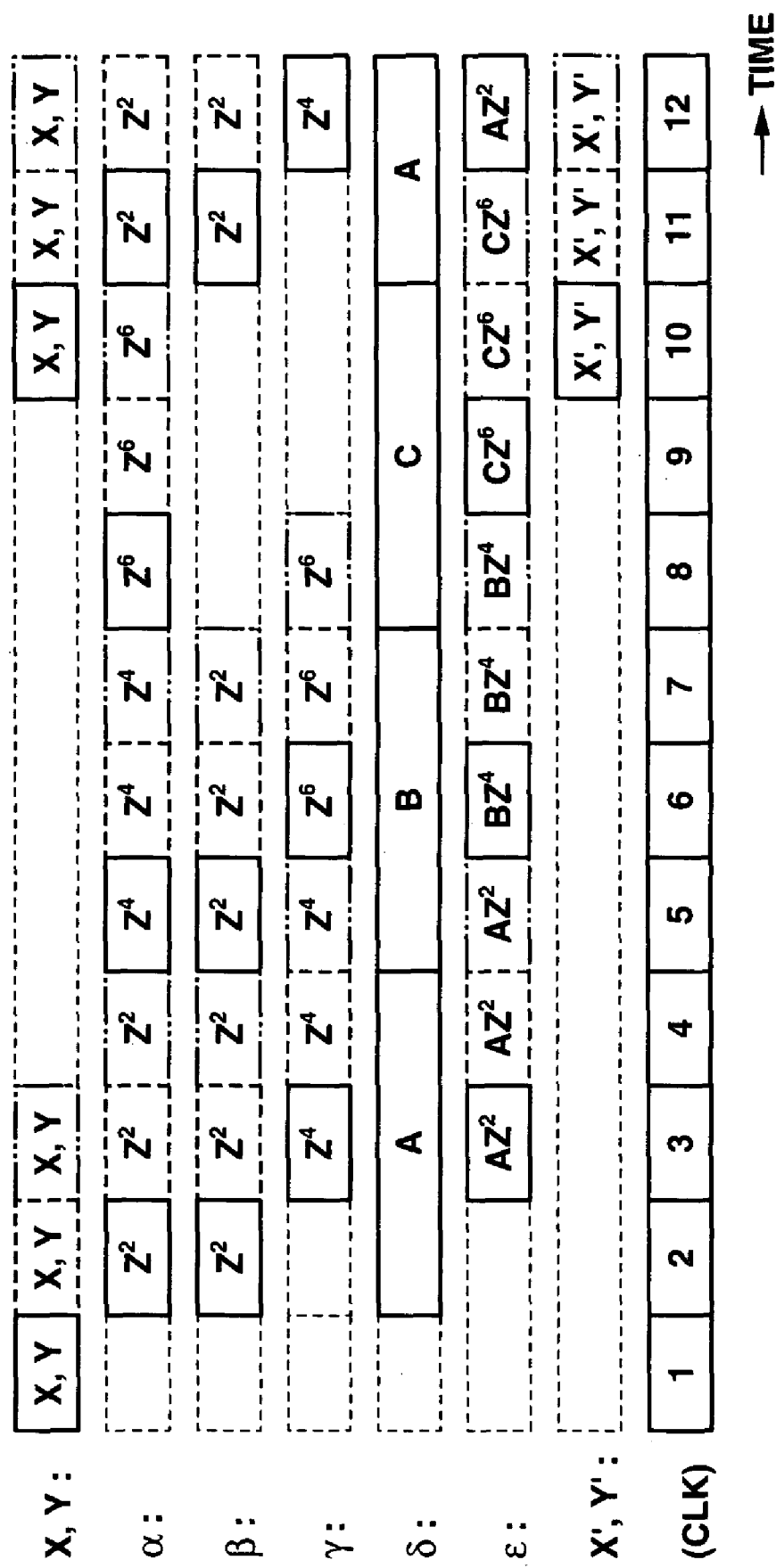
FIG. 18 is a timing chart of data output in pipeline processing in the improved operation in FIG. 17.

FIG. 18 shows a timing chart of the data output in pipeline processing, improving the operation shown in FIG. 17. At the operating timing in FIG. 17, the coordinate position (X', Y') of the original data, as an output, after 7 clocks from the input of the interpolation coordinates (X, Y) is obtained. That is, the acquisition of one result needs the time corresponding to 7 clocks. On the other hand, referring to FIG. 18, at the 10th-cycle, the same operation as that at 1st-cycle is performed. Therefore, by the 9-cycles, the processing of 3 pixels is performed. That is, the processing of 1 pixel is performed by the 3-cycles on the appearance.

Figure 19:
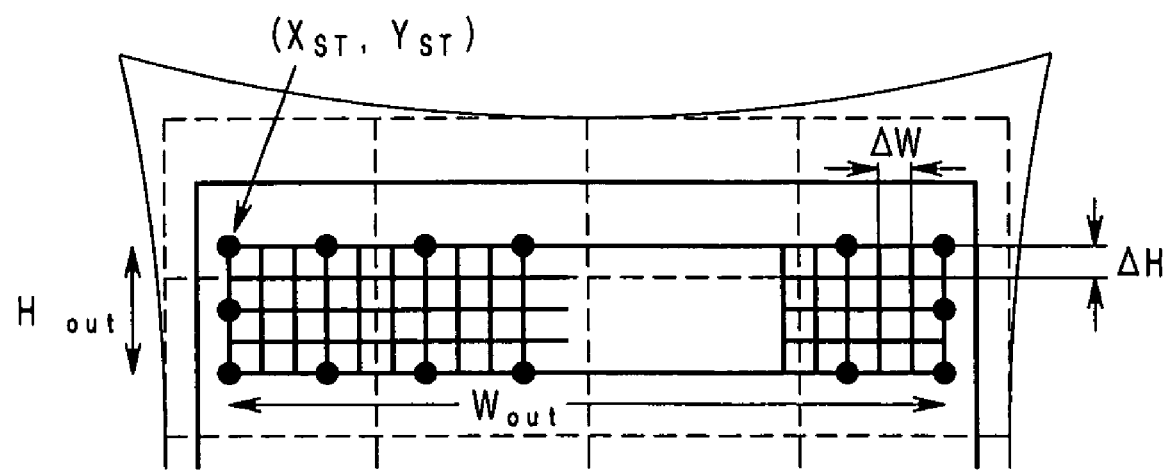
FIG. 19 is an explanatory diagram for a method for calculating input image ranges in the distortion correction processing of three channels.

The description has been given of the example of the distortion correcting range calculation of one channel by the distortion correcting range calculating unit. Next, a description is given of distortion correcting range calculation of three channels perfomed by one distortion correcting range calculating unit for the same time as that of one channel. Referring to FIG. 19, upon setting the range on the corrected image shown in FIG. 12, pixels for range calculation of four sides of a target region are thinned-out to ⅓ of the number of the pixels and the calculation is performed, thereby ending the calculation of three channels for the same processing time as that of one channel. The amount of thinning-out processing is determined by register setting. Since the calculation is performed at the coordinate (shown by the solid circle) obtained by the thinning-out processing as shown in FIG. 19, the processing is performed corresponding to a plurality of channels for the same processing time as that of one channel without increasing the circuit scale. Then, in the use of color image, one circuit unit operates for 3 channels without the distortion correcting range calculating units for R, G, and B and one distortion correcting range calculating unit may be used in this case. The processing is executed for the same time without increasing the circuit scale.

Figure 20:
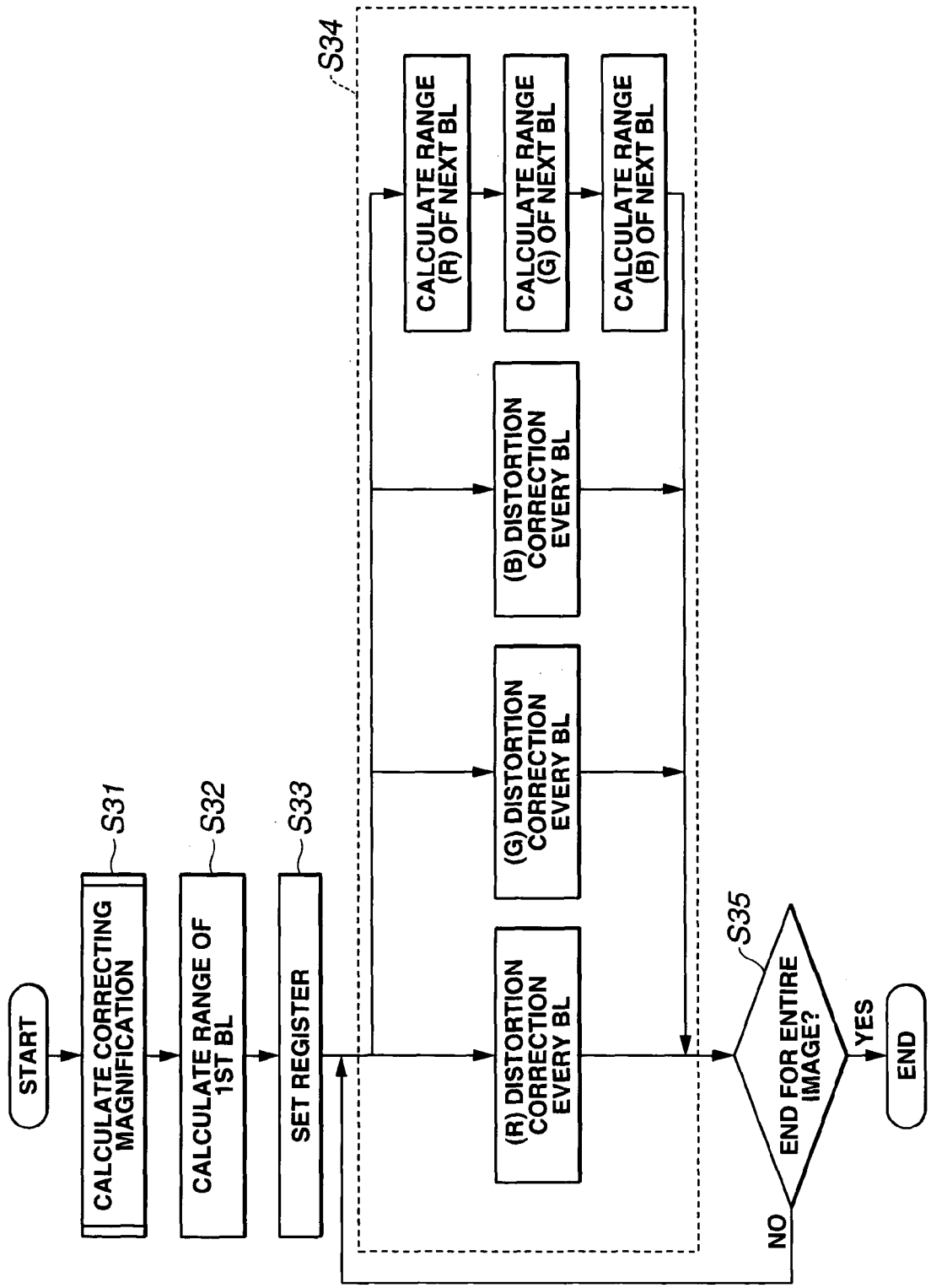
FIG. 20 is a flowchart for explaining the operation of distortion correction processing of the three channels.

FIG. 20 is a flowchart for explaining the operation of the distortion correction processing in the case of 3 channels. The distortion correction processing shown in FIG. 14 is applied to that in the case of 3 channels.

Steps S31 to S33 and S35 in FIG. 20 are the same as steps S11 to S13 and S15 in FIG. 14.

In step S34, the distortion correction processing every block line in 3 channels and the following calculation are simultaneously executed. That is, the calculation includes the calculation of the input range of the next block line for the first channel (e.g., R)→ the calculation of the input range of the next block line for the second channel (e.g., G)→ the calculation of the input range of the next block line for the third channel (e.g., B).

Thus, during the simultaneous distortion-correction of a plurality of input signals using a plurality of channels, the distortion correcting range calculation of the block line, serving as the next processing target, is sequentially repeated for a plurality of input signals, thereby calculating the ranges of a plurality of channels by one distortion correcting range calculating unit. Further, during executing the distortion correction processing, the input image range for the processing of the next distortion correction is calculated. Upon ending the distortion correction processing of one block line, the input image range for the processing of the next distortion correction is known and the distortion correction processing of the next block line can be sequentially and smoothly performed without delay.

As mentioned above, according to the first embodiment of the present invention, the distortion correcting range calculating unit for calculating the input image range for distortion correction processing is arranged. Therefore, the corrected image obtained by the distortion correction processing can be outputted within the output range to be outputted without overs and shorts. By effectively using the original data, the distortion is corrected, thereby correcting the distortions including the pincushion distortion, the barrel distortion, and the curvilinear distortion. Further, the input range necessary for the processing every block line is calculated, thereby minimizing the amount of transfer data.

Figure 21:
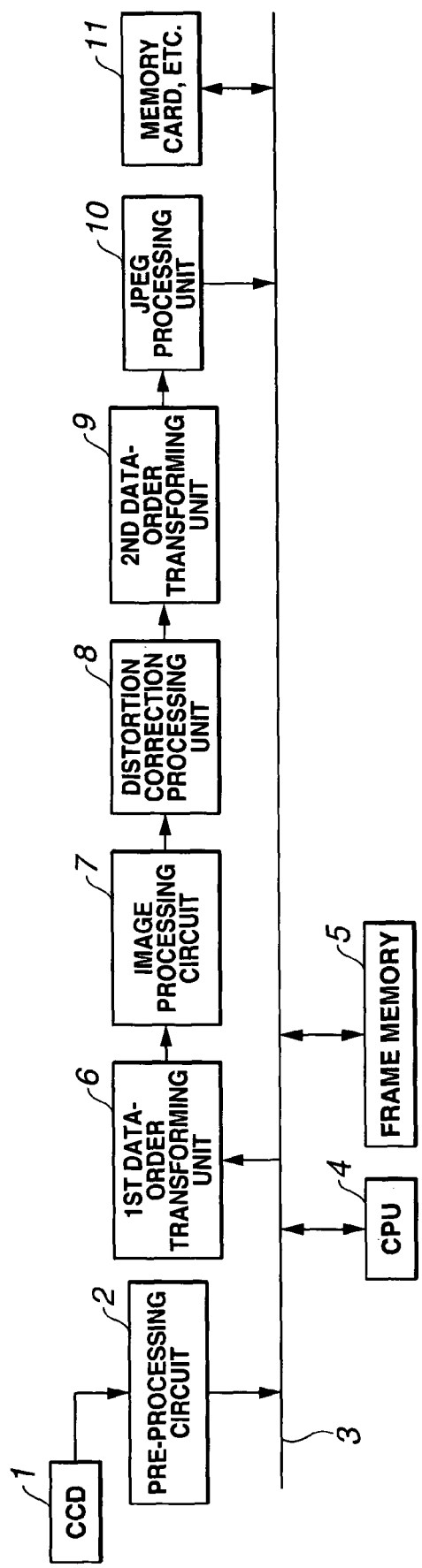
FIG. 21 is a block diagram showing the entire configuration of an image processing apparatus according to a second embodiment of the present invention.

FIG. 21 is a block diagram showing the entire configuration of an image processing apparatus according to a second embodiment of the present invention. The configuration shown in FIG. 21 is obtained by deleting the distortion correcting range calculating unit 12 shown in FIG. 1. The configuration of the distortion correction processing unit shown in FIG. 21 is the same as that shown in FIG. 2.

[Formula 1] in the coordinate transformation for distortion correction calculates the position on the entire screen of both the corrected image and the image at the position (X', Y') of a result of the coordinate transformation.

However, the image data inputted to the distortion correction processing unit 8 is in units of block line. The distortion correction processing unit 8 must know the spatial position relationship (position on the two-dimensional space) of the input image data. The control register 85 designates the position of the block line to be processed by the distortion correction processing unit 8.

Figure 23:
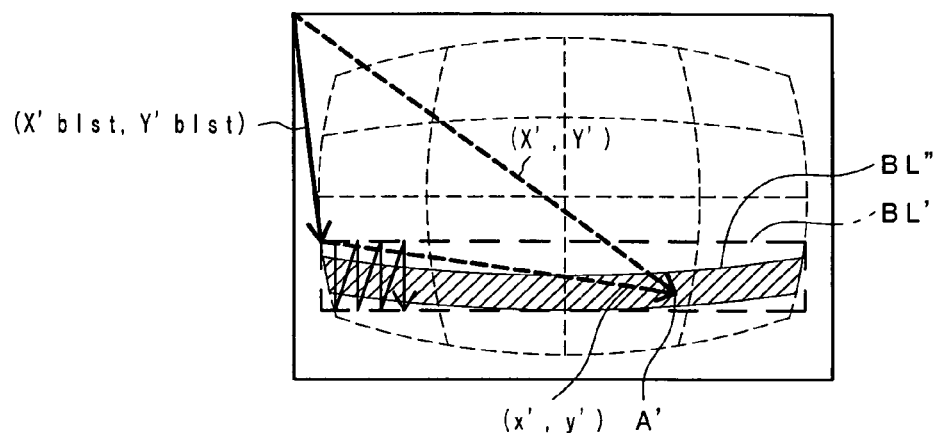
FIGS. 23 and 24 are diagrams showing a relationship between the image-pickup data before the processing of the correction and the corrected image after the processing of the correction.
Figure 24:
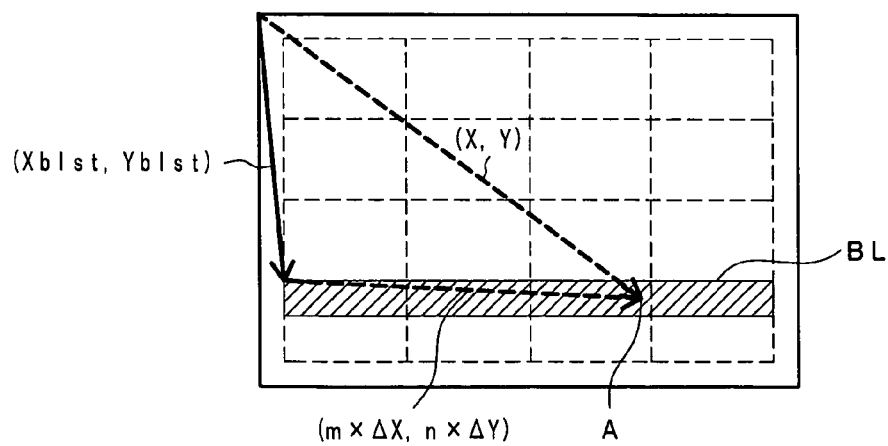

FIGS. 23 and 24 show a relationship between the picked-up image before processing of the correction and the corrected image after processing of the correction. FIG. 23 shows the picked-up image data. FIG. 24 shows the corrected image. FIGS. 23 and 24 are conceptual diagrams in the case of paying attention to one pixel position A in one block line BL in the corrected image (image on the output side). The coordinates (X, Y) of the position A in the corrected image (output image) are transformed into coordinates (X', Y') of a position A' in (the input image) by using [Formula 1] for coordinate transformation for distortion correction.

The coordinate positions (X, Y) and $(X_{b1st}, Y_{b1st})$ and the coordinate positions (X', Y') and $(X'_{b1st}, Y'_{b1st})$ denote the positions from the origin on the entire screen. Here, the origin is the upper left end on the entire screen.

The image data to be inputted to a distortion correction block is in units of block line, shown by reference symbol BL. Therefore, in order to perform the distortion coordinate transformation of the pixel A in the corrected image, the pixel A needs to be transformed into the coordinate position (x', y') on the coordinate system in the block line BL so as to finally perform the interpolation.

First, the coordinate position (X, Y) for the pixel of the corrected image (output image) in FIG. 24 is generated by the following [Formula 3].

$X=X_{b1st}+m\times\Delta X$ $Y=Y_{b1st}+n\times\Delta Y$ [Formula 3]

Reference symbols ΔX and ΔY denote interpolation pitches. When the interpolation pitches ΔX and ΔY are 1.0 or more, the reduced image is generated and, when the interpolation pitches ΔX and ΔY are less than 1.0, the enlarged image is generated. The coordinate position $(X_{b1st}, Y_{b1st})$ corresponds to the point of left shoulder of the block line on the output of the distortion correcting block, i.e., the start point of the block line. When (m, n)=(0, 0), $X=X_{b1st}$ and $Y=Y_{b1st}$ and the coordinate position $(X_{b1st}, Y_{b1st})$ is therefore calculated from [Formula 3]. Starting from m=0 and n=0, values m and n are alternately increased one by one, thereby generating the coordinate position (X, Y) of all pixels in the block line BL. Relative to the block line BL, the coordinate positions of all images in the block line BL are transformed in accordance with [Formula 1]. Then, the coordinate positions are mapped to a modified hatching area BL" shown in FIG. 23. A block line BL' shown in FIG. 23 corresponds to an input data range necessary for processing the block line BL shown in FIG. 24. The position $(X'_{b1st}, Y'_{b1st})$ corresponds to the upper left of the block line BL', and does not match the upper left of the modified hatching area in consideration of the pixel necessary for interpolation. The block line BL' is set by using a supporting function (distortion correcting range calculating unit 12) described with reference to FIG. 1.

The coordinate position (X, Y) of the output image after the correction, generated in accordance with [Formula 3], is coordinate-transformed in accordance with [Formula 1], thereby obtaining the coordinate position (X', Y') of the input image before the correction shown in FIG. 23. The difference between the coordinate-transformed coordinate position (X', Y') and the coordinate position $(X'_{b1st}, Y'_{b1st})$ is obtained, thereby obtaining the coordinate position (x', y') with the left end of the block line (rectangular portion shown by a thick broken line), as the origin.

As a consequence, the interpolation is performed in units of block line based on the coordinate position (x', y') in the block line.

The register 85 sets the block line BL' shown by a thick broken line on the input image side shown in FIG. 23. The generation of the value of the block line BL' needs a supporting function which can calculate an input range (distortion correcting range) of the image data in accordance with the modification of distortion. The supporting function may be added to the distortion correcting function of the distortion correction processing unit 8.

Figure 25:
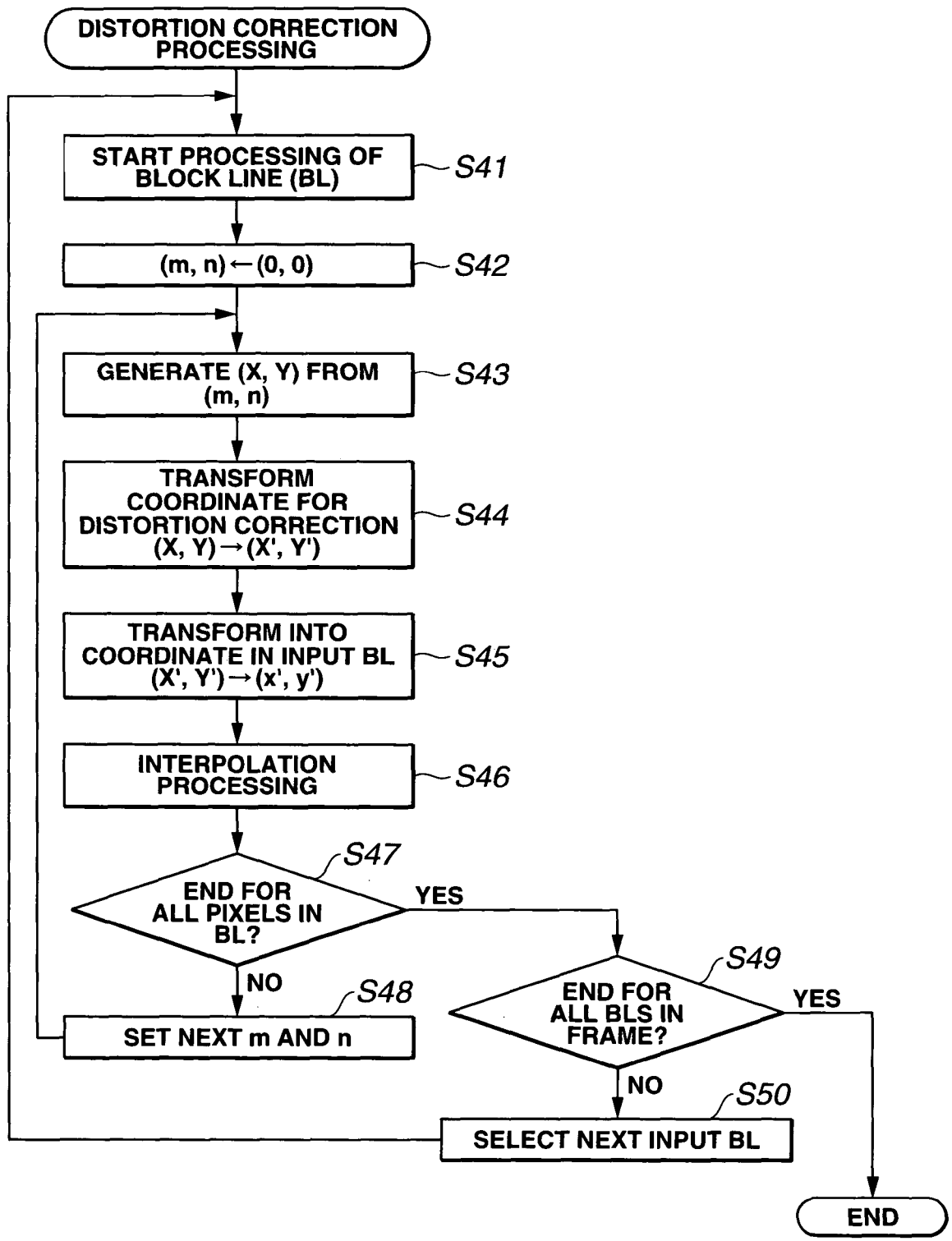
FIG. 25 is a flowchart for the distortion correction processing shown in FIGS. 23 and 24.

Next, a description is given of the flow of distortion correction with reference to FIG. 25. FIG. 25 is a flowchart of the distortion correction shown in FIGS. 23 and 24.

First, the processing of the block line hatched in FIG. 24 starts (in step S41). In [Formula 3] mentioned above, (m, n) is set to (0, 0) (in step S42), thereby obtaining the left end of the hatching area shown in FIG. 24, i.e., the start coordinate-position $(X_{b1st}, Y_{b1st})$ of the block line. In accordance with [Formula 3], the coordinate position (X, Y) of the corrected image is obtained. In this case, the values m and n are incremented by one, thereby generating the coordinate position (X, Y) of each pixel in the block line BL hatched in FIG. 24 (in step S43).

Subsequently, the position (X, Y) on the coordinate system of the corrected image is transformed into the position (X', Y') on the coordinate system of the picked-up image before the correction by using [Formula 1] (in step S44).

The position (X', Y') on the coordinate system of the picked-up image is transformed into the position (x', y') on the coordinate system in the input block line BL by the above-mentioned method (in step S45).

Subsequently, the interpolation is performed based on the coordinate position (x', y') in the block line BL, and the interpolation data is calculated from data on a plurality of pixels in the neighborhood of the coordinate position (X', Y') by the 16-point interpolation, thereby obtaining the data on the corrected image corresponding to one pixel (in step S46).

It is determined whether or not the above-mentioned steps are performed for all pixels in the block line BL on the coordinate system of the corrected image (in step S47). If it is determined that the steps are not performed for all pixels, the next values m and n are set (in step S48) and steps S43 to S47 are repeated. If it is determined in step S47 that the steps are performed, the processing shifts to step S49.

In step S49, it is determined whether or not the distortion correction ends for all the block lines BL in the entire screen (frame). If it is determined that the distortion correction does not end for all the block lines BL, the next input block line BL is selected and steps S41 to S49 are repeated. If it is determined in step S49 that the processing ends for the entire screen, the processing ends.

FIGS. 26 to 29 show modifications of FIG. 25.

In the digital zoom operation or in the case of cutting-out only the small region as a target, the image pickup data may be partly used. The image pickup data is selectively stored from the CCD, thereby saving the memory. In order to correct the distortion in units of block line in this case, information $(X'_{imgst}, Y'_{imgst})$ indicating the position of the stored data on the image pickup element is necessary.

Figure 26:
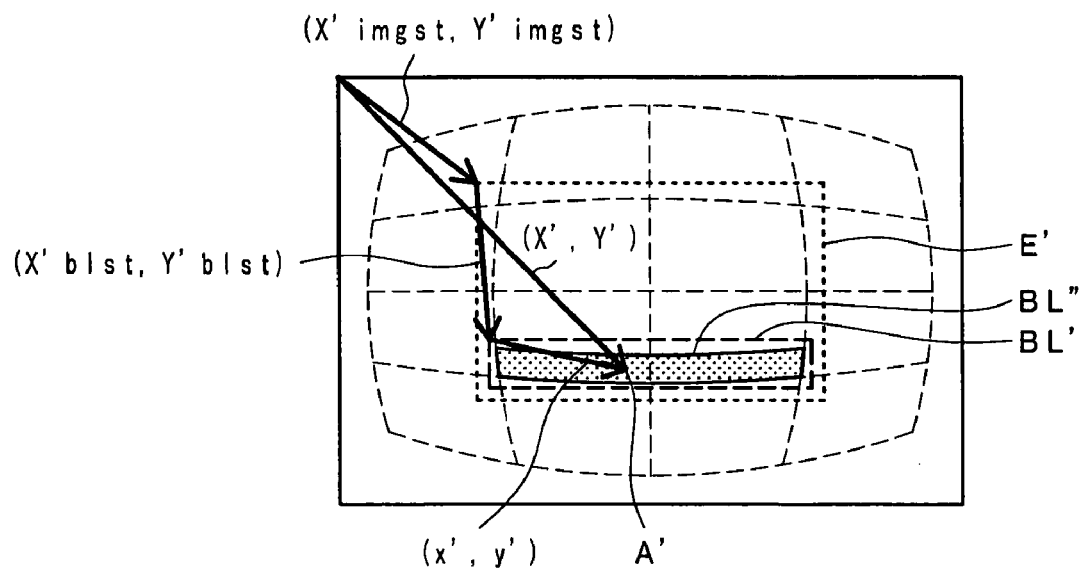
FIGS. 26 and 27 are diagrams showing a relationship between the image-pickup data before the processing of the correction and the corrected image after the processing of the correction in the digital zoom operation.
Figure 27:
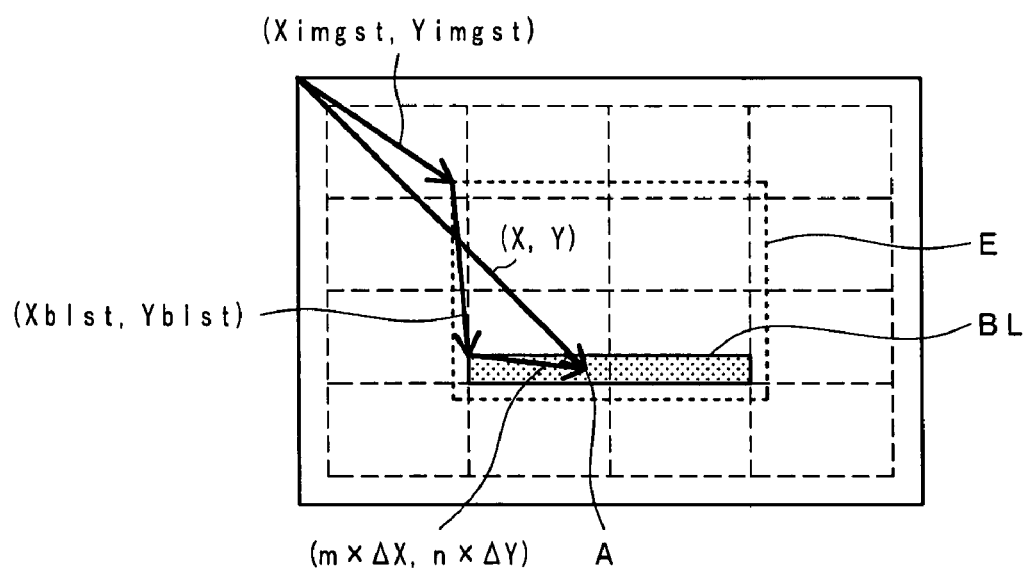

FIGS. 26 and 27 show the digital zoom operation. As shown in FIGS. 26 and 27, only the central portion is cut out from the picked-up image data. Unlike the case shown in FIG. 25, the position to be cut out the entire screen is set by the pre-processing circuit 2, as mentioned above. Only the necessary portion is cut out and stored based on the setting, and the range is shown by reference symbol E' in FIG. 26.

First, the start position $(X_{imgst}, Y_{imgst})$ corresponding to the left end of the range E for digital zoom operation on the entire screen in FIG. 27 is set. Subsequently, the block line BL is set and is shown by a dotted pattern here. In this case, the coordinate position $(X_{b1st}, Y_{b1st})$ having the left end of the cutting-out range E as the origin is determined. By changing m and n similarly to [Formula 2], the coordinate of the pixel in the block line BL is generated.

As a consequence, the position (X, Y) on the coordinates on the entire screen are determined from the coordinate positions $(X_{imgst}, Y_{imgst})$, $(X_{b1st}, Y_{b1st})$, and $(m \times \Delta X, n \times \Delta Y)$.

The coordinate position (X', Y') in the picked-up image is obtained from the above-determined coordinate position (X, Y) by using [Formula 1].

Subsequently, the coordinate position (x', y') in the block line BL' in the picked-up image data is obtained.

First, the coordinates $(X'_{imgst}, Y'_{imgst})$ of the left end are obtained from the setting range E' on the image pickup surface of the image pickup data. The coordinate position $(X'_{imgst}, Y'_{imgst})$ of the left end of the block line BL', serving as the coordinate having the left end of the cutting-out range E', as the center, is obtained in advance by using the supporting function, and the coordinate position (x', y') on the coordinate in the block line BL' is determined. As a consequence, the interpolation every block line is performed.

Figure 28:
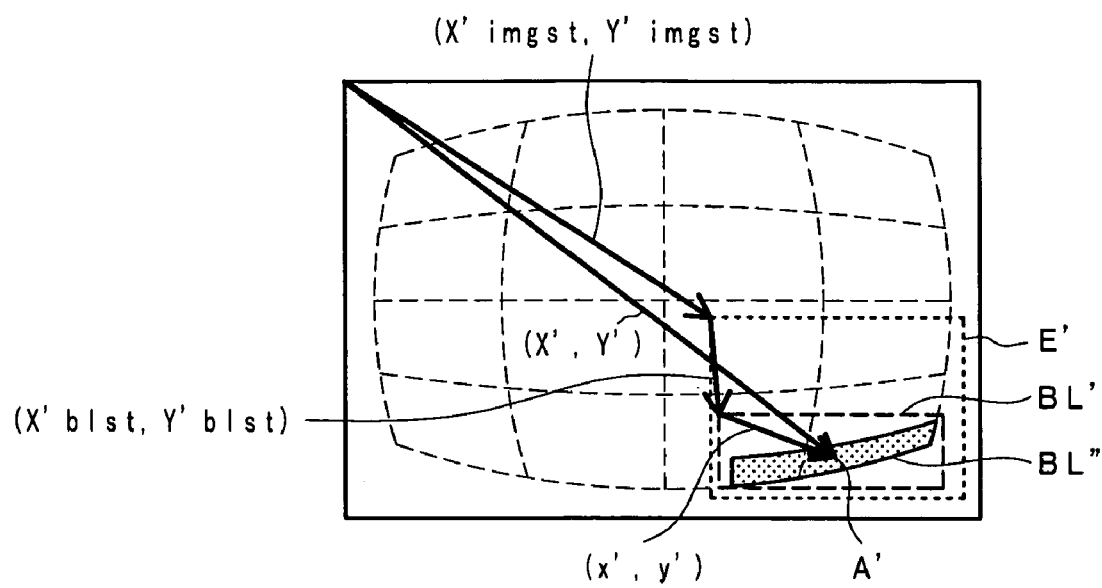
FIGS. 28 and 29 are diagrams showing a relationship between the image-pickup data before the processing of the correction and the corrected image after the processing of the correction upon cutting-out a region from image pickup data.
Figure 29:
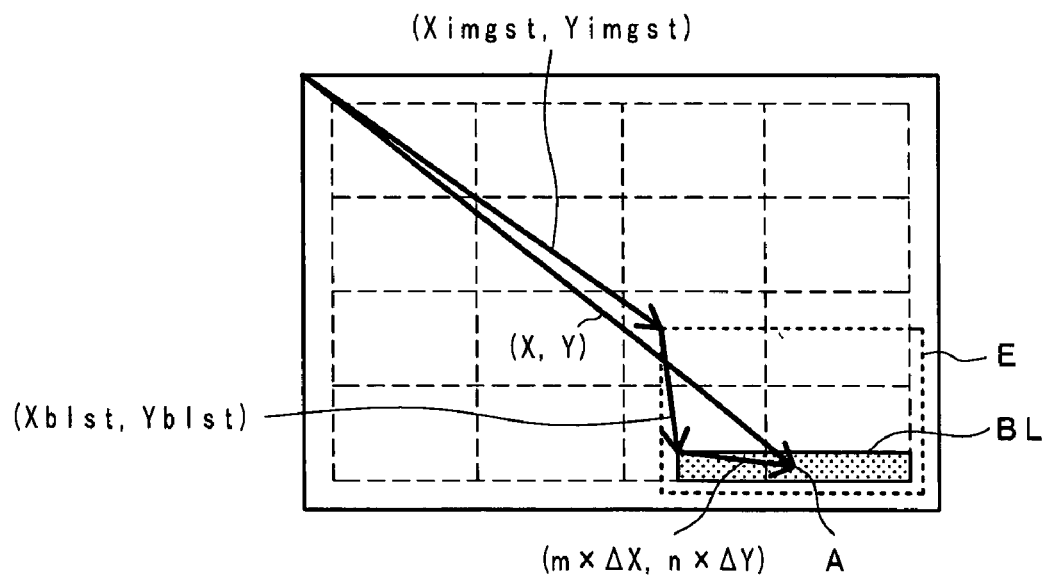

FIGS. 28 and 29 show the case of cutting-out an area, e.g., the end on the screen from the image pickup data. This corresponds to the case of cutting-out the end of the image pickup data in a monitoring camera. Referring to FIGS. 28 and 29, the same reference symbols as those in FIGS. 26 and 27 are designated. In FIGS. 28 and 29, only the positions different from the cutting-out positions in FIGS. 26 and 27 enable the same operation as those in FIGS. 26 and 27.

In the general digital camera, since the CPU sets the cutting-out area to the control register, the cutting-out position is known and the above transformation is possible. In the case of correcting the distortion of the data after recording, the position and the size of the cutting-out area need to be recorded to a tag. In this case, the correcting coefficient is simultaneously recorded.

The CCD, serving as the image pickup element, has a monitor mode (mode for preventing the reading the entire image of the image-captured screen) in many cases. In the monitor mode, the lines are thinned-out in many cases. Even when the line is the same as that on the two-dimensional space of the image pickup element, the data size sometimes varies on the data. Further, in the pre-processing, the pixels in the lateral direction may be thinned-out. In addition, the image pickup data from the CCD is subjected to filtering processing of a low-pass filter (LPF) and the interpolation and the data is thereafter stored to the frame memory. In this case, the sampling ratio to the longitudinal one to the lateral one might not be an integer. Further, in the recording of YCbCr in JPEG processing, the sampling is performed at the double interval for Cb and Cr components in the lateral direction in many cases, and the data is reduced in the lateral direction. In [Formula 1], the data is corrected by values $S_x$ and $S_y$.

Figure 30:
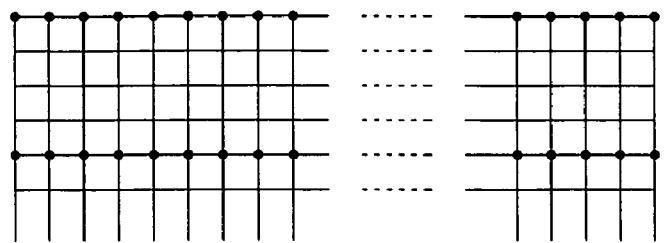
FIGS. 30 to 32 are explanatory diagrams of the operation for thinning-out a line in a monitor mode in a CCD.
Figure 31:
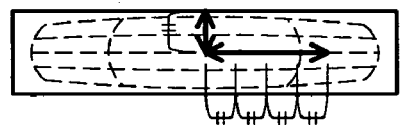
Figure 32:
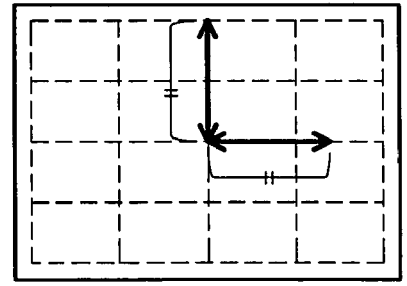

FIG. 30 shows the state of thinning-out 3 lines in the longitudinal direction when the data is actually sent from the CCD only to the position shown by a solid circle upon picking up the image data in the image pickup operation. As like this, in the monitor mode, only the thinned-out data is outputted from the CCD. The output data is stored in the memory, thus obtaining image data stained in the up and down directions as the thinning-out result, as shown in FIG. 31. Referring to FIG. 32, even when the data with the same distance from the center in the space is cut out, such a phenomenon that the shorter image is outputted in the longitudinal direction, as compared with the image in the lateral direction, as shown in FIG. 31. As a consequence, since the effect of distortion correction is the larger in the distortion correction in [Formula 1] as the position is the farther from the center, the effect of distortion correction differs in the longitudinal direction and in the lateral direction.

As mentioned above, in order to correct the asymmetric state of the images in the longitudinal direction and in the lateral direction, the correcting coefficients $S_x$ and $S_y$ are provided. As shown in FIG. 31, the image needs to be expanded in the longitudinal direction, the correcting coefficients $S_x$ and $S_y$ are set to 1 and 4, respectively.

The effect of the correcting coefficients $S_x$ and $S_y$ enables the precise distortion correction even when the sampling ratio differs in the longitudinal direction and the lateral direction.

As mentioned above, when the sampling ratio is not an integer, the correcting coefficients $S_x$ and $S_y$ may be set to non-integers. Further, when the interval between the pixels of the image pickup element differs in the longitudinal direction and in the lateral direction (e.g., rectangular pixel), the distortion can be corrected.

Figure 33:
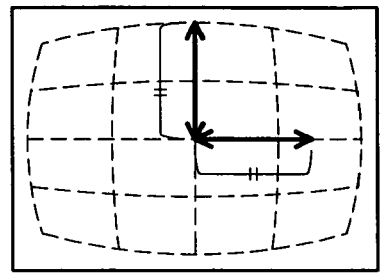
FIGS. 33 and 34 are explanatory diagrams for the operation for thinning-out color data in a YC422 format data in the lateral direction.
Figure 34:
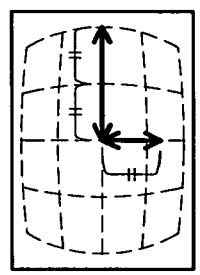
Figure 36:
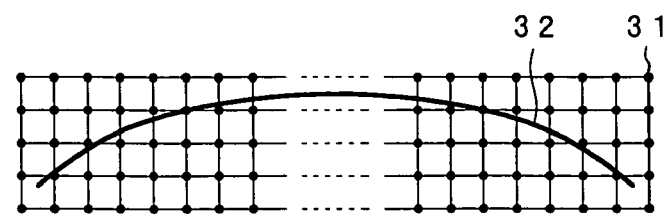
FIG. 36 is a diagram showing a relationship between pixels in the CCD and the picked-up image.

Generally, in the JPEG processing, data Y, Cb, and Cr are recorded. The setting in this case is considered as shown in FIGS. 33 and 34. In the case of data in YC422 format, the resolution of color data is ½ in the lateral direction, as compared with luminance data. In this case, the correcting coefficient $S_x$ and $S_y$ of the color data are set to 2 and 1 for correction, respectively.

When the center of distortion does not match the center of the image, the subject in the center before the correction is deviated from the center after the correction. In [Formula 1], the center of the image is corrected by using the corrected values $(X_{off}, Y_{off})$ of the central deviation. Thus, it is possible to prevent the change of the subject in the center of the image after/before the correction.

Figure 35:
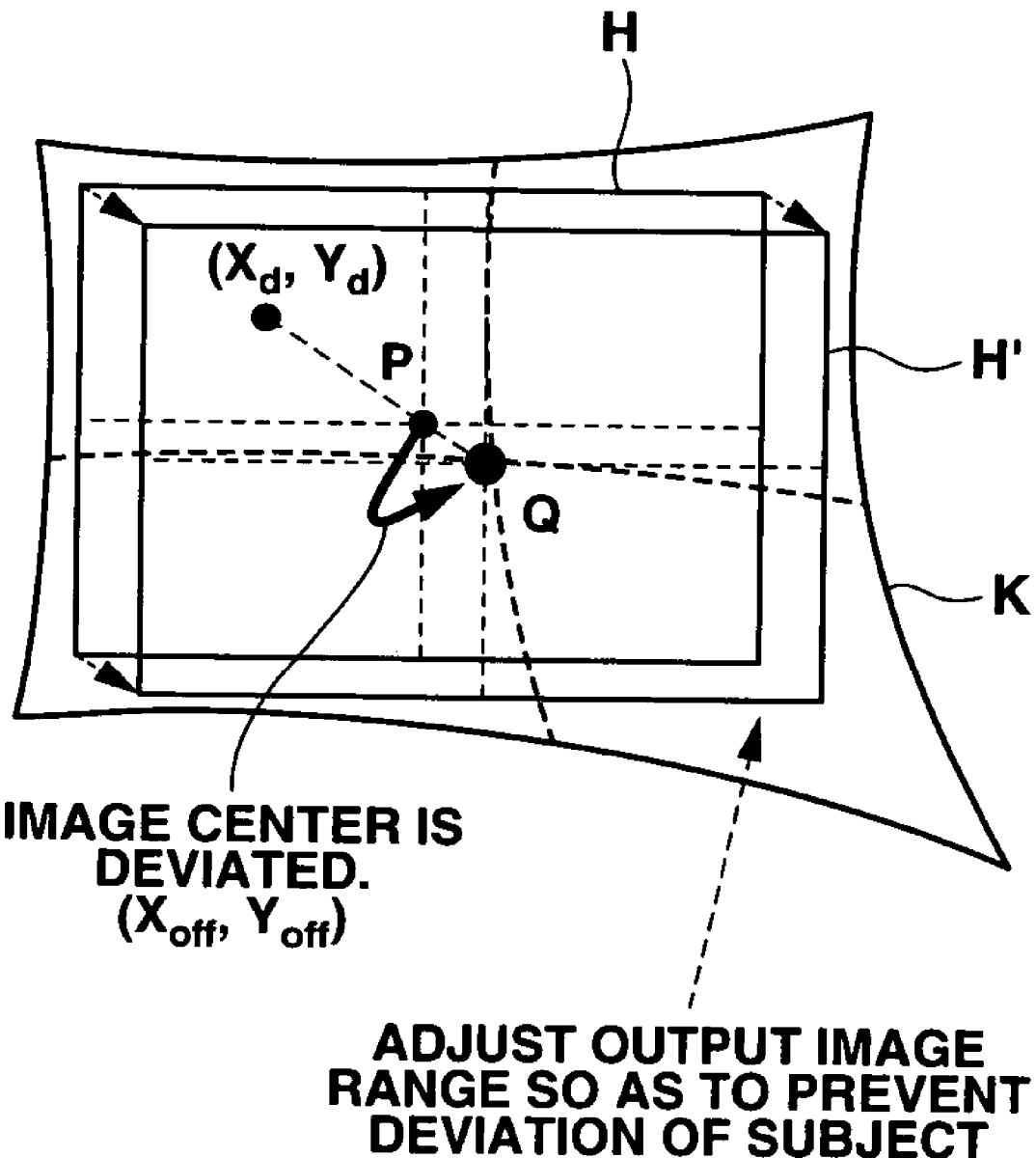
FIG. 35 is an explanatory diagram for the deviation of the center of the image.

FIG. 35 is an explanatory diagram of the central deviation of the image.

Referring to FIG. 35, the corrected image is shown. Referring back to FIG. 4, the center of distortion matches the center of the image, that is, the center of the CCD (center of the image) matches the lens optical axis (center of distortion), as mentioned above.

As shown in FIG. 35, the center of distortion is deviated from the center of the CCD. Since the distortion center $(X_d, Y_d)$ differs from the center of the image as shown in FIG. 35, a center P of the image within an output range H is deviated to a Q point (shown by a large solid circle) in the case of the distortion correction without consideration of the deviation of center. When the center of the actually-picked-up image is deviated from the center of the image displayed with the amount of distortion correction, a user feels the strangeness very much. Then, in order to position the data, which is originally in the center of the output range H before the distortion correction, in the center of the output range, the cutting-out method of the distortion-corrected image data is changed. In order to execute the cutting-out method, the center deviation of image may be defined by using the values $(X_{off}, Y_{off})$, thereby changing the cutting-out method of the image data. The values central deviation $(X_{off}, Y_{off})$ of the image is set, thereby moving the output range from H to H'. The subject at the center P of the original image can be corrected to be in the center within the output range H' after the correction.

According to the second embodiment, with reference to FIG. 35, the feeling of strangeness due to the deviation of the subject in the center is prevented.

According to the second embodiment of the present invention, as mentioned above, the spatial position of the small region (e.g., block line) can be calculated and the distortion can be corrected in units of small region. Further, the image data which is thinned-out and is stored is subjected to the precise distortion correction and the data which is obtained by cutting-out an arbitrary region, e.g., in the digital zoom operation.

The entire configuration of an image processing apparatus according to a third embodiment of the present invention is the same as that shown in FIG. 21.

Figure 37:
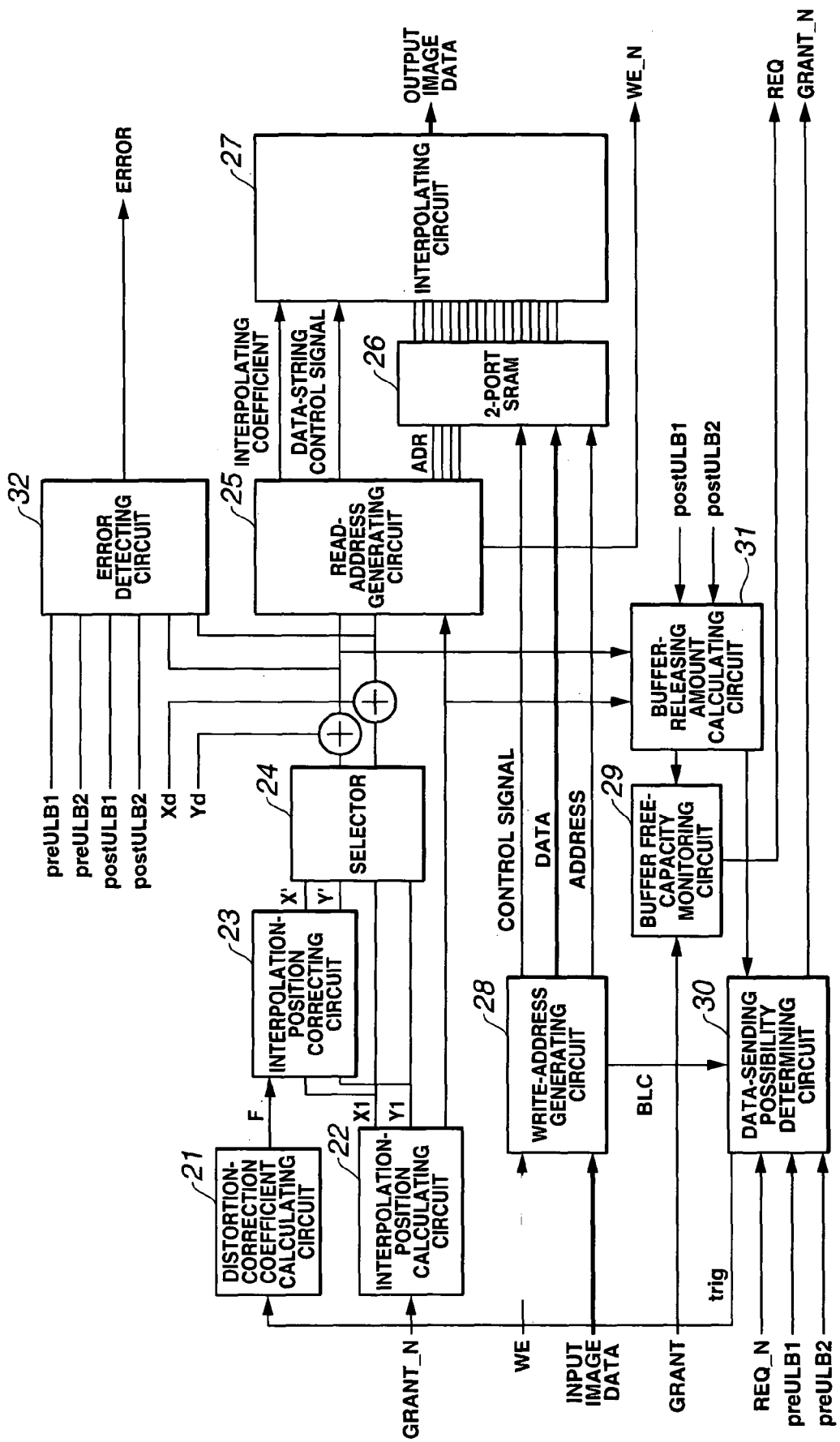
FIG. 37 is a block diagram showing the detailed configuration of a distortion correction processing unit in an image processing apparatus according to a third embodiment of the present invention.

FIG. 37 shows the detailed configuration of the distortion correction processing unit 8 shown in FIG. 2.

A description is given of a corresponding relationship between units shown in FIG. 37 and the units shown in FIG. 2. Referring to FIG. 37, an interpolation-position calculating circuit 22 corresponds to the interpolation-position generating unit 811 shown in FIG. 2, a selector 24 corresponds to the selector 813 shown in FIG. 2, and a distortion-correction coefficient calculating circuit 21 and an interpolation-position correcting circuit 23 correspond to the distortion-correction coordinate transforming unit 812 shown in FIG. 2. Further, a 2-port SRAM 26 shown in FIG. 37 corresponds to the inner memory unit (inner buffer) 82 shown in FIG. 2. A write-address generating circuit 28, a buffer free capacity monitoring circuit 29, a data-sending possibility determining circuit 30, and a buffer-releasing amount calculating circuit 31 and a read-address generating circuit 25 correspond to the memory control unit 83 shown in FIG. 2. An interpolating circuit 27 corresponds to the interpolation calculating unit 84 shown in FIG. 2. An error detecting circuit 32 is not shown in FIG. 2 and, however, it is connected to the memory control unit 83. The error detecting circuit 32 has a function for transmitting an error (ERROR) to the CPU 4 when the amount of distortion is large in the distortion correction and the distortion is larger than setting values of the areas preULB and postULB, which will be described later, is caused.

Upon returning a grant in response to the request from the later stage of the distortion correction processing unit 8, the interpolation-position calculating circuit 22 calculates an interpolation position $(X_1, Y_1)$ corresponding to 1 unit line (hereinafter, referred to as 1 UL), taking the grant (granting a request) as a trigger. Here, the 1-UL means one unit in the writing and reading the image data corresponding to a constant amount, aligned in the column direction, upon reading and writing the data to the memory unit in the processing of the block line. That is, the 1-UL means data having a constant number of pixels aligned in one column in the column direction on the block line (BL).

The interpolation-position correcting circuit 23 multiplies a distortion correcting coefficient F from the distortion-correction coefficient calculating circuit 21 to the interpolation position $(X_1, Y_1)$, and calculates the coordinate position (X', Y') of the original data before the distortion correction processing. The selector 24 selects positions $(X_1, Y_1)$ and (X', Y'). In the distortion correction, the selector 24 selects and outputs the position (X', Y'). Only in the enlargement and reduction (resize), the selector 24 selects and outputs $(X_1, Y_1)$.

The 2-port SRAM 26 is a buffer that stores data in the distortion correction processing unit 8.

Figures 38, 39:
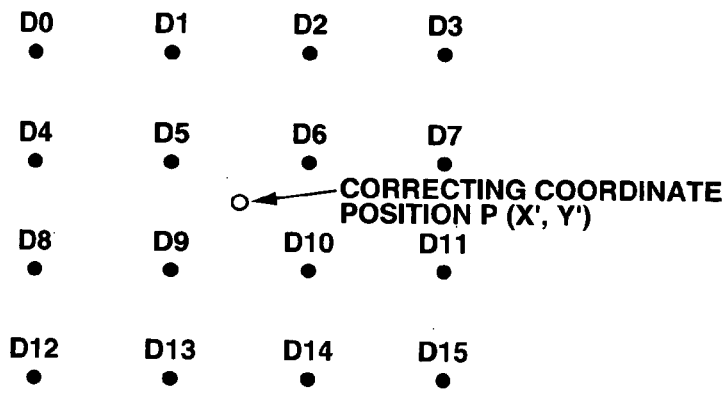
FIG. 38 is an explanatory diagram for the interpolation calculation in an interpolating circuit.
FIG. 39 is an explanatory diagram of an inner memory unit in a distortion correction processing unit.

The read-address generating circuit 25 generates an address (ADR) in a 2-port SRAM 16 corresponding to the interpolation position, outputs a control signal for aligning the output from the 2-port SRAM 26, outputs a write control signal WE_N synchronously with output image data, and outputs a data-string control signal sending an indication where the position of $D_0$ shown in FIG. 38 and [Formula 3] is on the 2-port SRAM.

The write-address generating circuit 28 generates an address (ADDRESS) of the 2-port SRAM 26, serving as an inner memory, in accordance with a write control signal WE, completes the input operation of data corresponding to 1 UL, and then counts-up the inner counter (BLC).

The data-sending possibility determining circuit 30 has a function for determining, from a BLC value, the operating state of the circuit, the head coordinates of the next UL, and a request (REQ) state from the later-stage circuit of the distortion correction processing unit 8, whether or not grant (GRANT_N) is sendable in response to an REQ signal from the later-stage circuit and setting GRANT_N to 1 when it is determined that the grant is sendable.

The interpolating circuit 27 performs the 16-point interpolation of the image data corresponding to the interpolation position. The buffer-releasing amount calculating circuit 31 calculates the difference between the head coordinate of UL in the progress of processing and an integer of the head coordinate of UL to be next processed, as the released amount of buffer (refer to FIG. 50).

The buffer free capacity monitoring circuit 29 sends a request (REQ=1) to the previous-stage of the distortion correction processing unit 8, when the amount data (UL) stored in the 2-port SRAM 26, serving as the inner buffer, is held and the buffer has a free area.

Next, a description is given of the circuit operation of the distortion correction processing unit 8 shown in FIG. 37.

First, when the 2-port SRAM 26, serving as the inner memory unit (inner buffer), has a free area, a request (REQ) is sent, as data request, to the previous-stage from the buffer free capacity monitoring circuit 29, the buffer free capacity monitoring circuit 29 receives a grant, serving as the request reception, from the previous-stage and, simultaneously with the reception, decrements one on a counter (in the circuit 29) which stores the number of ULs for storing the data in the 2-port SRAM 26. The buffer free capacity monitoring circuit 29 transfers the 1 UL, as one unit of operation, in response to the one-time request and grant. When the counter indicates 0, the request is canceled.

The data flows from the previous-stage circuit to the write-address generating circuit 28, and is written to the 2-port SRAM 26. Then, the inner counter (BLC) of the write-address generating circuit 18 counts-up every input of 1 UL.

For the purpose of 16-point interpolation in the interpolating circuit 27, the 2-port SRAM 26 comprises 16 (4×4) 2-port SRAMs which simultaneously perform the writing operation and the reading operation as shown in FIG. 39.

Here, a description is given of the 2-port SRAM 26 with reference to FIG. 39. The number of memories and the scale of memory may be different. For example, referring to FIG. 39, the width (length of UL) of the block line is 96 and maybe longer or shorter. The number of memories and the scale of memory may be determined depending on the circuit scale and the correcting performance. Further, the number of 2-port SRAM is total 16 (4×4) and may be total 4 (2×2) if it is a 4-point interpolation. The number of 2-port SRAM may be determined depending on the interpolation system (indicating what the number of points is used for the data interpolation).

Referring to FIG. 39, the memory space comprises 16 2-port SRAMs having addresses in the lateral direction in the order of UL and addresses in the longitudinal direction every 2-port SRAM. A description is given of the state in the processing using an integer N at an arbitrary timing. Data to be stored in four 2-port SRAMs Nos. 0, 4, 8, and 12 aligned in the longitudinal direction corresponds to UL data Nos. 4N, 4N+4, 4N+8, and 4N+12, respectively. Data to be stored in four 2-port SRAMs Nos. 1, 5, 9, and 13 corresponds to UL data Nos. 4N+1, 4N+5, 4N+9, and 4N+13, respectively. Data to be stored in four 2-port SRAMs Nos. 2, 6, 10, and 14 corresponds to UL data Nos. 4N+2, 4N+6, 4N+10, and 4N+14, respectively. Data to be stored in four 2-port SRAMs Nos. 3, 7, 11, and 15 corresponds to UL data Nos. 4N+3, 4N+7, 4N+11, and 4N+15, respectively.

Similarly, the data is stored in four sets of the 2-port SRAMs Nos. 0, 1, 2, and 3, Nos. 4, 5, 6, and 7, Nos. 8, 9, 10, and 11, and Nos. 12, 13, 14, and 15 aligned in the lateral direction.

Figure 40:
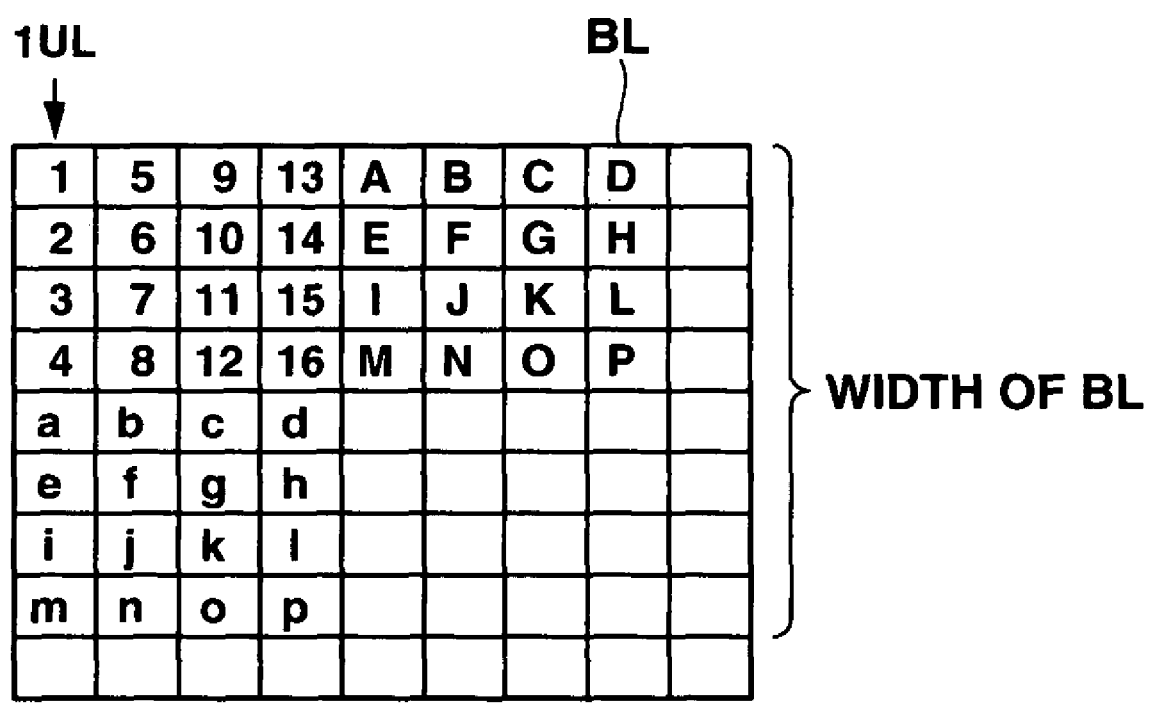

A description is given of the state of writing the data in the 2-port SRAM with reference to FIGS. 40 and 41. Referring to FIGS. 40 and 41, the block lines having 8 lines (pixels) as shown in FIG. 40 are assumed, and data are sequentially inputted in units of UL in the order of "1, 2, . . . , i, and m", "5, 6, . . . , j, and n", and "9, 10, . . . , k, and o". FIG. 41 shows on which positions of the 16 (4×4) 2-port SRAMs Nos. 0 to 15 the data in the writing order shown in FIG. 40 are written. For example, the image data (indicated by Nos. 1 to m) corresponding to 1 UL, serving as one column in the longitudinal direction on the left side shown in FIG. 40, are distributed and stored in the 2-port SRAMs Nos. 0, 4, 8, and 12. Incidentally, expressions 0 to 92, 1 to 93, 2 to 94, and 3 to 95 indicated every longitudinal line of the 2-port SRAMs Nos. 0, 4, 8, and 12 in the longitudinal direction as shown in FIG. 39 are different from expressions indicated in the unit lines (1 to m . . . , 5 to n . . . , and 9 to o . . . , . . . ) as shown in FIG. 40. Because, in order to know the writing order of the 16 (4×4) pieces of image data in FIGS. 40 and 41, reference symbols are added every group of 16 2-port SRAMs, e.g., 1 to 16, a to p, and A to P. . . . In the case shown in FIG. 39, the expressions indicated every longitudinal lines of the 2-port SRAMs Nos. 0, 4, 8, and 12 in the longitudinal direction correspond to the data order of one UL in the longitudinal direction. Pixel data Nos. 0 to 95 of one UL are distributed and written to the 2-port SRAMs Nos. 0, 4, 8, and 12, respectively. Therefore, the expression indicating which order of the pixel in the pixel order (0 to 95) in one unit line (UL) are added to the four longitudinal lines aligned in the longitudinal direction as shown in FIG. 39. Four-multiple pixels (0, 4, 8 . . . and 92) of the unit line (UL) are stored in the 2-port SRAM No. 0 in the longitudinal direction shown in FIG. 39. (Four-multiple+1) pixels (1, 5, 9 . . . and 93) of the unit line (UL) are stored in the 2-port SRAM No. 4 in the longitudinal direction. (Four-multiple+2) pixels (2, 6, 10 . . . and 94) of the unit line (UL) are stored in the 2-port SRAM No. 8 in the longitudinal direction. (Four-multiple+3) pixels (3, 7, 11 . . . and 95) of the unit line (UL) are stored in the 2-port SRAM No. 12 in the longitudinal direction. Similarly, the pixels are stored in the 2-port SRAM Nos. 1, 2, and 3, Nos. 5, 6, and 7, Nos. 9, 10, and 11, and Nos. 13, 14, and 15.

Referring back to FIG. 39, the data of one unit line (UL) is sequentially stored, pixel by pixel, in the four 2-port SRAMs aligned in the longitudinal direction. The first UL data is written to the 2-port SRAMs Nos. 0, 4, 8, and 12 (line No. 4N in FIG. 39). The next UL data is written to the 2-port SRAMs Nos. 1, 5, 9, and 13 (line No. 4N+1 in FIG. 39). In the buffer format shown in FIG. 39, even if the distortion correction moves the interpolation position in any direction, the 16 points around an arbitrary coordinate in the buffer can be simultaneously extracted by one-time access.

The data-sending possibility determining circuit 30 receives a request (REQ_N) from the later-stage circuit. When the data-sending possibility determining circuit 30 is in the sending state of the next UL data and then outputs a grant (GRANT_N). The grant (GRANT_N) becomes the trigger to the circuit itself. Then, the interpolation-position calculating circuit 22 starts the operation, after the operation of one unit line (UL), and the head coordinates of the next UL is calculated and the processing ends.

The interpolation-position calculating circuit 22 starts operating, and the data-sending possibility determining circuit 30 sends the operating trigger (trig) to the distortion-correction coefficient calculating circuit 21 synchronously with the output of the interpolation position $(X_1, Y_1)$. The distortion-correction coefficient calculating circuit 21 operates, corresponding to one unit line (UL), then calculates the head coordinates of the next UL, similarly to the interpolation-position calculating circuit 22, and ends the operation.

The read-address generating circuit 25 issues the read address to the 16 2-port SRAMs 26 from the input interpolation coordinates.

Next, a description is given of a reading and interpolating method.

The interpolating method is shown in FIG. 38. FIG. 38 is an explanatory diagram showing the interpolation calculation in the interpolating circuit 27. The corrected coordinate position P (X', Y') has been already obtained by using [Formula 1] as mentioned above. In the case of obtaining the pixel value (luminance data) at the coordinates, pixel data $D_0$ to $D_{15}$ of the 16 points around the coordinate P (X', Y') is obtained. Among the pixel data $D_0$ to $D_{15}$, by knowing from which one of the 16 memories the pixel data $D_0$ is sent, the pixel data $D_1, D_2 \ldots,$ and $D_{15}$ can be recognized based on the positional relationship to the pixel data $D_0$. As will be described later, the pixel data $D_0$ is obtained by the coordinates of the interpolation position.

Figure 42:
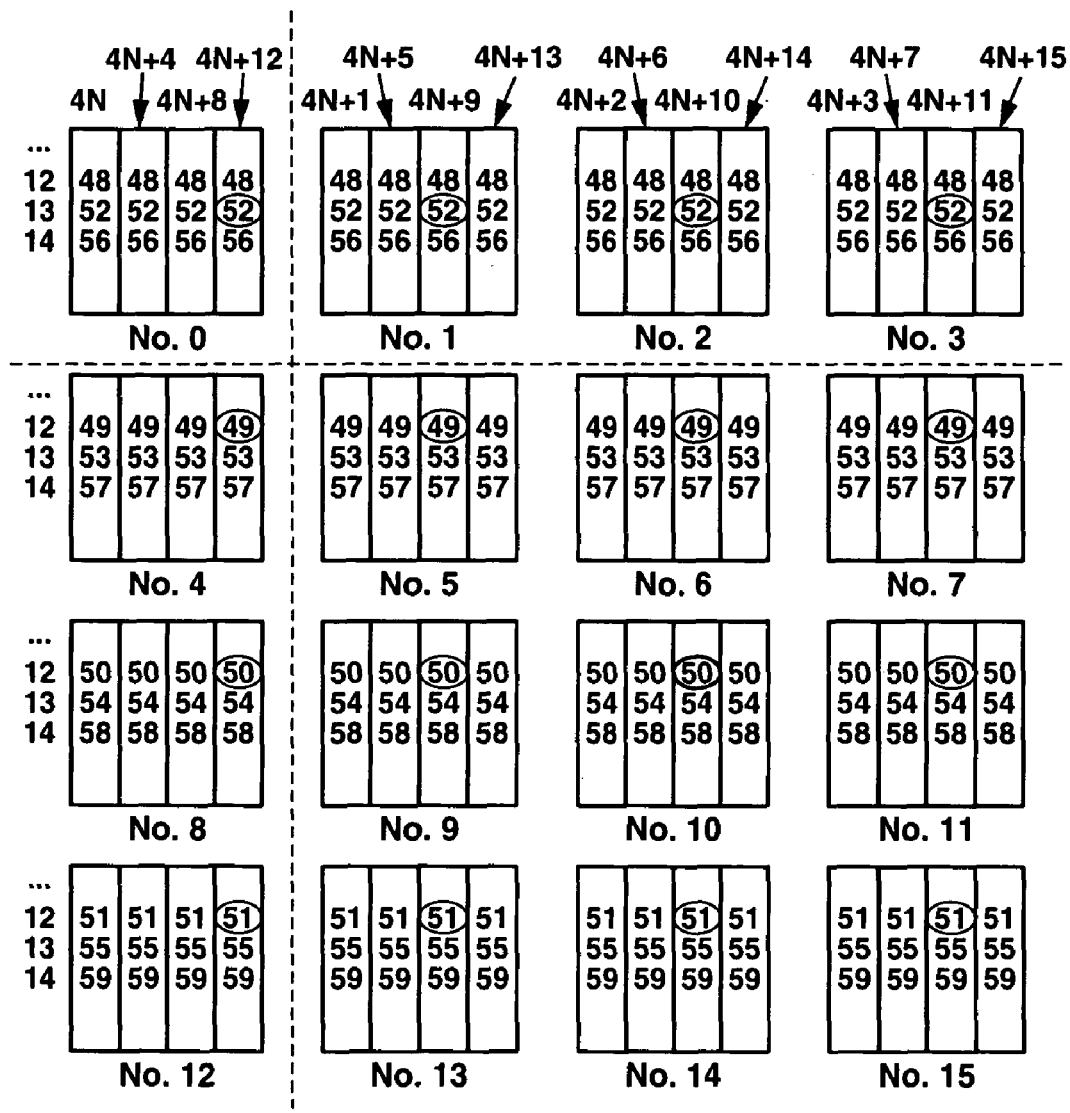
FIG. 42 is an explanatory diagram for obtaining "$D_0$" necessary for calculating the coordinate position for correction shown in FIG. 38.

FIG. 42 shows a reading example from a buffer comprising the 16 2-port SRAMs. Now, it is assumed that the interpolation position (X', Y') has X'=10 . . . . and Y'=50 . . . . (symbol " . . . " denotes a number of decimal point or less). Then, the coordinate of X'=10 . . . . is (4×0+10) or more and, then, the interpolation position in the lateral direction exists slightly on the right side of the unit line (UL) of the 2-port SRAM No. 4N+10. Further, the coordinates of Y'=50 . . . . are (4×12+2) or more, then, the memory (No. 10) which stores the 50-th pixel in the unit line (UL) No. 4N+10 outputs the pixel $D_5$ shown in FIG. 38, and the memory for outputting the pixel data $D_0$ is therefore No. 5 on the upper left of the memory.

The pixel data $D_0$ to $D_{15}$ shown in FIG. 38 corresponds to portions indicated by circles shown in FIG. 42. Therefore, the addresses are generated so that the pixel data $D_0$ to $D_{15}$ is output.

The image data outputted from the 2-port SRAM No. 0 does not correspond to the pixel data $D_0$. In the example shown in FIG. 42, the output from the 2-port SRAM No. 5 corresponds to the pixel data $D_0$. Thus, in order to identify from which one of the memories the data is outputted, the read-address generating circuit 25 outputs the data-string control signal, and the interpolating circuit 27 which performs the interpolation calculation by using the received signal recognizes that from which one of the 2-port SRAMs 26 the pixel $D_0$ is outputted, for performing the 16-point interpolation.

If the pixel data $D_0$ to $D_{15}$ is recognized, the interpolation is performed by using an interpolating formula [Formula 4], the pixel data of the corrected coordinate position is obtained as $D_{out}$.

$$D_{out} = k_{x0}(k_{y0}D_0 + k_{y1}D_4 + k_{y2}D_8 + k_{y3}D_{12}) + \quad \text{[Formula 4]}$$
$$k_{x1}(k_{y0}D_1 + k_{y1}D_5 + k_{y2}D_9 + k_{y3}D_{13}) +$$
$$k_{x2}(k_{y0}D_2 + k_{y1}D_6 + k_{y2}D_{10} + k_{y3}D_{14}) +$$
$$k_{x3}(k_{y0}D_3 + k_{yi}D_7 + k_{y2}D_{11} + k_{y3}D_{15})$$

Figure 49:
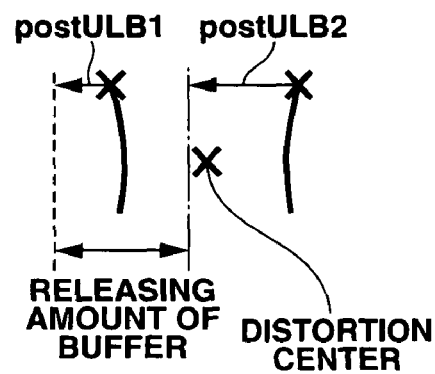
FIGS. 48 and 49 are explanatory diagrams for the amount of buffer necessary for the distortion correction processing.
Figure 48:
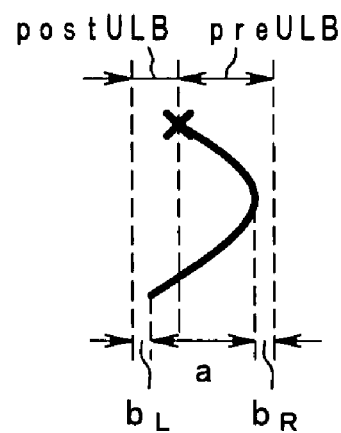
Figure 50:
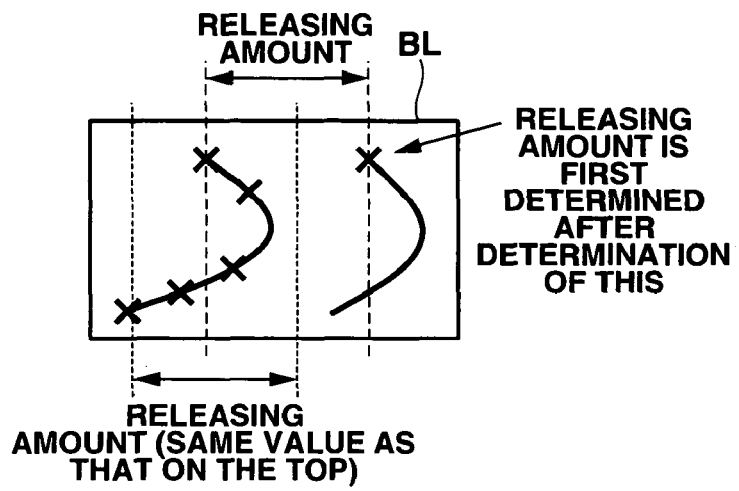
FIG. 50 is an explanatory diagram for a calculating method of the releasing amount as a result of UL processing.

After outputting the last UL data, the buffer-releasing amount calculating circuit 31 calculates the difference between the head coordinate of the unit line (UL) whose processing has just ended and the head coordinates of the next UL (refer to FIG. 50). In order to release the buffer which stores unnecessary data, the released amount of buffer is outputted to the buffer free capacity monitoring circuit 29. Preferably, the released amount of buffer upon the UL processing crossing the distortion center is the amount of buffer in consideration of the change in values of postULB1 and postULB2, as shown in FIG. 49. Reference symbols preULB and postULB shown in FIG. 48 denote areas having a predetermined width on the front and back sides in the row direction, arranged to the coordinate position of the first one of the pixels forming the UL. Upon the UL processing crossing the distortion center, the released amount of buffer does not mean the usual difference from the head coordinate of the UL, but the released amount of buffer is adjusted by referring to the amount of change in postULB (ULB: Unit Line Buffer) whose referred value changes (the amount of adjustment is the difference, as (postULB1–postULB2), refer to FIG. 49).

When the amount of (difference between the head coordinates of the ULs)+(amount of adjustment) is negative, the negative value is stored. Until the processing advances and the released amount of buffer is over the negative value, the buffer is not released.

In addition to the released amount of buffer, the buffer-releasing amount calculating circuit 31 sends, to the data-sending possibility determining circuit 30, how much of data is necessary for the next UL processing from the previous-stage circuit.

When the buffer has a free area as a result of calculating the released amount of buffer, the buffer free capacity monitoring circuit 29 issues a request to the previous-stage circuit.

The data-sending possibility determining circuit 30 determines whether or not the next data is sendable, based on the value of the area preULB and the inputs from the inner counter (BLC) of the write-address generating circuit 28 and the buffer-releasing amount calculating circuit 31. The data-sending possibility determining circuit 30 returns a grant (GRANT_N) in response to the request from the later-stage circuit.

Figure 43:
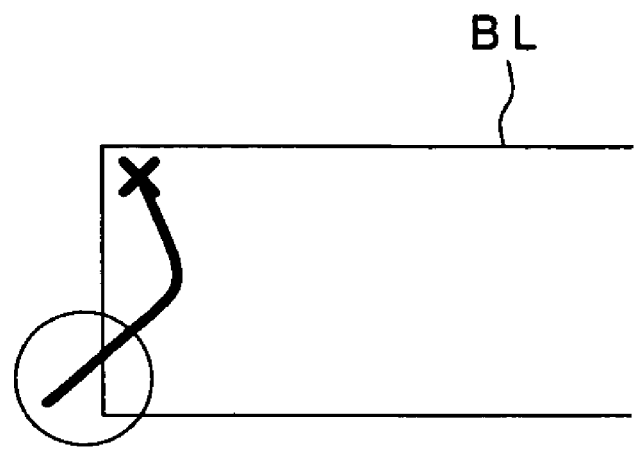
FIG. 43 is a diagram showing an example of error processing.
Figure 44:
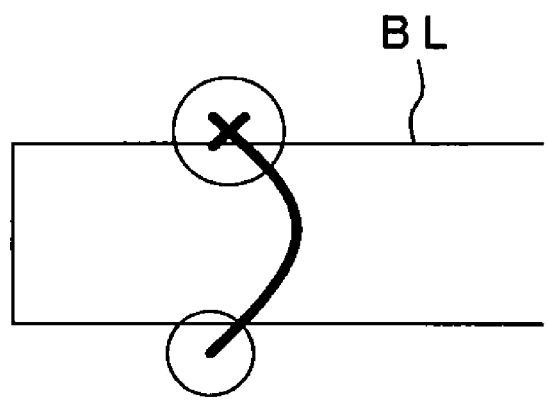
FIG. 44 is a diagram showing another example of the error processing.
Figure 45:
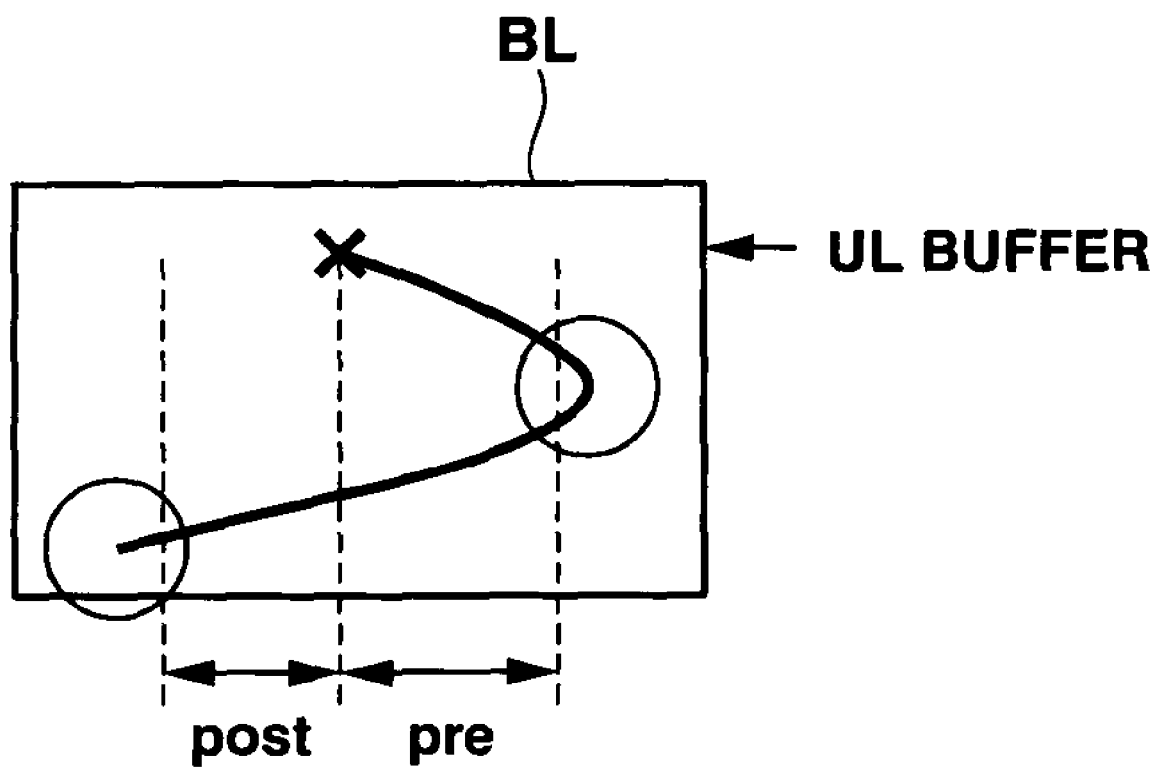
FIG. 45 is a diagram showing another example of the error processing.

The error detecting circuit 32 outputs an error, when the coordinates inputted to the read-address generating circuit 25 go beyond the left end and the right end (refer to FIG. 43) of the block line (BL) and go beyond the top end and the bottom end (refer to FIG. 44) of the block line (BL) and the amount of distortion exceeds the setting values of the areas preULB and postULB (refer to FIG. 45). The error is outputted based on the determination of coordinate. In the cases shown in FIGS. 43 and 44, the error is outputted but the processing continues. Further, in the case shown in FIG. 45, the error is outputted but the processing continues. In the case of the areas preULB and postULB shown in FIG. 45, not only the error is outputted but also the exceeded-amount is stored and is set to the register so that the CPU 4 can obtain the stored data.

As mentioned above, during calculating interpolation of the image on the input side relative to the image on the output side in the processing of the block line, the image goes beyond the range of the input image. In this case, the interpolation data is generated at the portion without having data within the input range, and the error detecting circuit 32 outputs an error indicating the interpolation is not possible.

Figure 46:
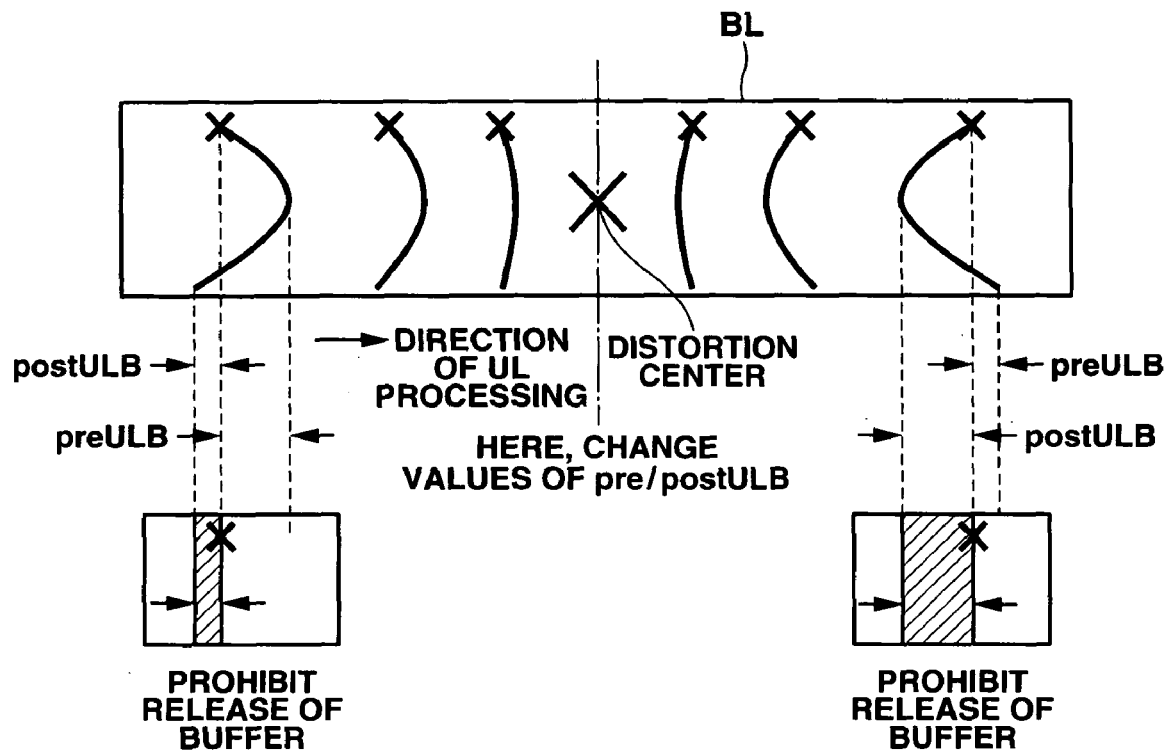
FIG. 46 is an explanatory diagram for the amount of buffer necessary for the distortion correction processing.

Referring to FIG. 46, the distortion of image is symmetric to the central coordinate of the distortion. Generally, the distortion is the smaller as it is the nearer the center and it is the larger as it is farther from the center. Then, generally, the shortage of data in the interpolation is prevented for all ULs by ensuring the buffer in consideration of the modification of block units (ULs) at both ends of the block line (BL). Then, a predetermined area preULB is arranged to the front side (on the right in FIG. 46) of the first interpolation coordinate (head coordinate indicated by a cross mark on the most top of the image data in the block line (BL) in FIG. 46), and a predetermined area postULB is arranged to the back side thereof.

The supporting function corresponds to the "distortion correcting range calculating unit" shown in FIG. 1. Referring to FIG. 12, a target area corresponds to the block line (BL) and is modified, in the distortion-correction coordinate transformation, to the one as shown in FIG. 13. In this case, an area preULB1/postULB1 is obtained from $X'_{TL}$, $Y'_{TL}$, $X_{Lmin}$, and $X_{Lmax}$ (refer to FIG. 48). Similarly, an area preULB2/postULB2 is obtained from $X'_{TR}$, $Y'_{TR}$, $X_{Rmin}$, and $X_{Rmax}$.

Figure 47:
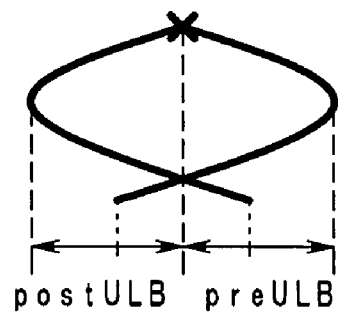
FIG. 47 is another explanatory diagram for the amount of buffer necessary for the distortion correction processing.

Further, the point passes through the center of distortion in the processing of UL, the bending direction of the optical distortion is reverse. Then, referring to FIG. 46, on the left and right of the distortion center, values of the areas preULB and postULB are different. In order to respond to values to the left and right of the distortion center, the largest value postULB on the right is used and the largest value of the area preULB on the left is used, as shown in FIG. 47. Then, even when it is unnecessary in the processing of one of the left and the right, data on one side of the left and the right must be large (that is, the buffer must be wide) and thus the unnecessary area of the buffer exists.

Then, both the values of the areas preULB and postULB are not preset to be larger, but the values of the areas preULB and postULB are set as variables. If the point passes through the central coordinate of the distortion, the values of the areas preULB and postULB are changed, thereby varying the amount of ensured buffer. In other words, the values of the areas preULB and postULB are changed after/before the distortion center, thereby preventing the unnecessary portion of the inner buffer. Thus, the relatively large distortion is corrected with a small buffer.

The areas preULB and postULB are set to the register 85. In order to generate the values of the areas preULB and postULB, the supporting function for calculating the input range of the image data in consideration of the modification of distortion is necessary. The supporting function may be added to the distortion correcting function of the distortion correction processing unit 8. The memory control unit 83 controls to prevent another processing from overwriting the areas preULB and postULB during the processing of one UL. The areas preULB and postULB may be set from the CPU 4 to the register 85 (refer to FIG. 2) or may be set by automatic calculation of the CPU.

In the distortion correction, the 16-point interpolation is performed. Further, referring to FIG. 48, the interpolation position as a result of the distortion correction can be moved by an interval a (a>0) during the processing of one UL. For the purpose of the 16-point interpolation, both the preside and the postside of the input image range needs a range obtained by adding, to the interval a, intervals $b_L$ and $b_R$ corresponding to the pixels necessary for interpolation.

When the point goes over the distortion center, the values of the areas preULB and postULB are changed, thereby narrowing one buffer to the necessary and minimum level. Further, the "distortion correction calculating unit" may output the result in consideration of the interpolation.

Referring to FIG. 39, the inner memory unit (inner buffer) 82 of the distortion correction processing unit 8 has 96 pixels in the longitudinal direction and 16 lines (pixels) in the lateral direction at the maximum level. The inner memory unit 82 is used and the distortion is corrected. The data in the processing of the block line is swept every at least one UL in the right direction in FIG. 39. Since several ULs are released at once, the sweeping of the data one UL by one UL is not necessarily performed. The inner-memory unit 82 sweeps the data, starting from the free state, then, 16 lines first enter, and the distortion is corrected. The unit lines (ULS) are processed and, then, unnecessary data (data from one UL to several ULs) is generated in the line on the left. Incidentally, the data is not necessarily unnecessary after the processing but data of several ULs are required in the case of a high enlargement magnification, until the data is unnecessary. For unnecessary data, the buffer is released (that is, the overwriting is permitted) and new data is inputted. The swepting image shifts to the right. Since the reading size is 16 lines at the maximum level, unnecessary data area is released and new data is sequentially overwritten. The unnecessary buffer area is entirely released at once. The releasing amount may be one line or five lines. For example, the data corresponding to the three lines are first inputted to the buffer and are unnecessary for the subsequent processing. Therefore, the unnecessary data is released, then, the next data is granted, and the next data is overwritten.

The head coordinates of the next UL must be determined to obtain the releasing amount of buffer after ending the processing of one UL, thereby the releasing amount being known (refer to FIG. 50). Since the inner buffer is small, it is necessary to calculate the head coordinates of the next UL to obtain the releasing amount of the buffer so that the portion storing unused data is released earlier as much as possible. Thus, the inner buffer can be effectively used. However, one request for distortion correction is sent from the later-stage circuit block, the grant in response to the one request is returned, data corresponding to one UL is outputted, another request is further sent, the grant is returned, and the coordinate is thereafter obtained. During the above-mentioned operation, the release of buffer is delayed and, as a result, the storing of another data is delayed. Thus, the pipeline processing operation has idle state of processing for a long time. Then, referring to FIG. 51, at the stage for the distortion correction (processing at coordinates 1 to n in FIG. 51), a next head coordinate n+1 is calculated after ending the processing at the coordinate n, irrespective of the request from the later-stage circuit block to calculate the releasing amount, and the buffer is released fast. Thus, new data is inputted from the previous-stage circuit block relatively fast, and the free area of the pipeline processing is used. However, in the case shown in FIG. 51, the coordinates of a pixel n+1 are calculated and then processing ends after the processing of the coordinates n. Therefore, as shown in FIG. 52, although the buffer has the data necessary for the next UL, the request is continuously sent from the later-stage circuit and then the pipeline processing has a free area. Since the pipeline processing still has a free area, there is a possibility of delaying the operating speed of the entire apparatus in a case that requests are continuously sent.

Figure 51:
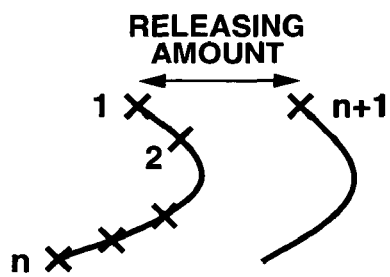
FIG. 51 is another explanatory diagram for the calculating method of the releasing amount as a result of UL processing.
Figure 52:
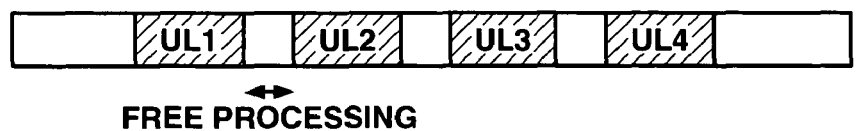
FIG. 52 is an explanatory diagram of a free area of pipeline processing in accordance with the processing shown in FIG. 51.
Figure 53:
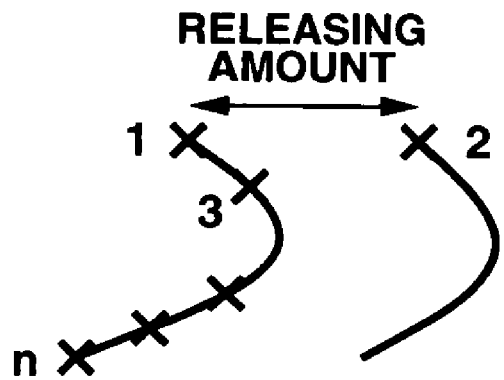
FIG. 53 is another explanatory diagram for the calculating method of the releasing amount in accordance with the UL processing.
Figure 54:
FIG. 54 is an explanatory diagram of a free area of pipeline processing in accordance with the processing shown in FIG. 53.
Figure 56:
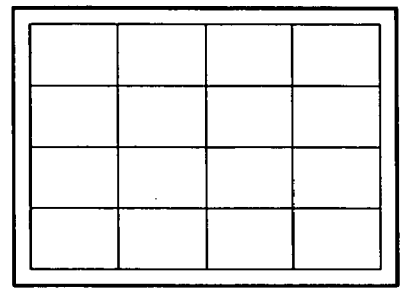
FIG. 56 is a diagram showing a grid subject.
Figure 57:
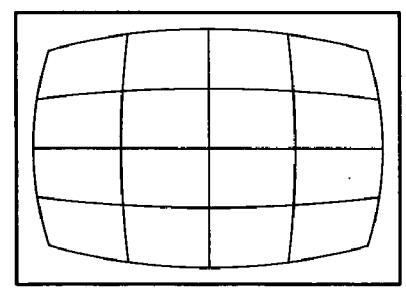
FIG. 57 is a diagram showing a picked-up image with the barrel distortion.
Figure 58:
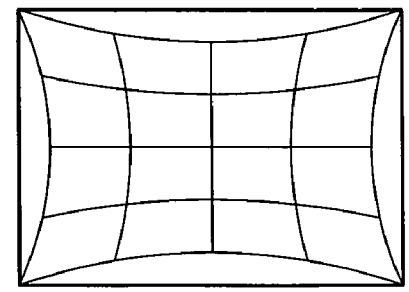
FIG. 58 is a diagram showing a picked-up image with the pincushion distortion.

Then, as an improvement against the case shown in FIG. 51, referring to FIG. 53, the next coordinate is determined earlier as much as possible and the releasing amount of the buffer is obtained. The head coordinates of the next UL is obtained at the stage earlier than the case of obtaining the next head coordinate at the final state as shown in FIG. 51, and the processing of the next UL is continuously performed when determining the necessary data is set, thereby reducing the free area during the processing. In other words, the UL data is held in the register before ending the processing of one UL, and the head coordinate position of the next UL is calculated, thereby obtaining, in advance, the releasing amount of the next-UL processing. Referring to FIG. 53, for the second pixel of the previously described distortion-correction at the coordinates 1 to n in FIG. 53, the head coordinate of the next UL is obtained in advance, and the releasing amount of buffer is obtained earlier. Thus, the releasing operation of buffer is fast and, referring to FIG. 54, the free area of the pipeline processing is reduced, as compared with the case shown in FIG. 52. However, the circuit is complicated and the control operation is difficult.

Figure 55:
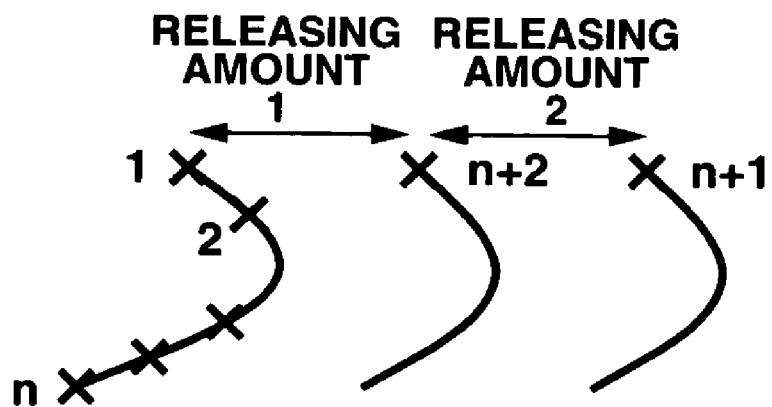
FIG. 55 is another explanatory diagram for the calculating method of the releasing amount in accordance with the UL processing.

Then, FIG. 53 is further improved, thereby obtaining FIG. 55. Referring to FIG. 55, the releasing amount (releasing amount 1) upon ending the processing of the current UL is known during the processing of previous UL. A coordinate n is calculated, thereafter, the head coordinates of the two-subsequent UL are thereafter calculated, and the releasing amount (releasing amount 2) is obtained in advance upon ending the processing of the next UL. As a consequence, the exceptional generation of the coordinates (generation of coordinates 2) during the processing of the UL as shown in FIG. 53 is not necessary. As mentioned above, the head coordinates of the two-subsequent UL, not but the head coordinates of the next UL, are obtained, thereby omitting the exceptional processing as shown in FIG. 53. Thus, the circuit is simple.

As mentioned above, according to the third embodiment of the present invention, the distortion can be corrected without increasing the amount of transfer of the bus and the memory capacity. In other words, the relatively large distortion can be corrected with a small buffer capacity.

The present invention can be widely applied to an image processing apparatus, an image processing method, and a distortion correcting method used for an electronic image pickup apparatus, such as a digital camera. A distortion correcting function is realized without increasing the circuit scale and the amount of transfer data. In the distortion correction, the spatial position is calculated, the picked-up image data, serving as the original data, is effectively used. The distortion based on the distortion aberration including the pincushion distortion, the barrel distortion, and the curvilinear distortion can be effectively corrected.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An image processing apparatus comprising a distortion correcting unit for sequentially performing distortion correction processing in units of block image data obtained by dividing an image data, the image processing apparatus further comprising a distortion correction range calculating unit, separate from said distortion correcting unit, for calculating an input image range necessary for distortion correction processing performed on the block image data by the distortion correcting unit, wherein the distortion correction range calculating unit comprises:

a coordinate generating unit that generates interpolation coordinates corresponding to pixels in a coordinate system of the image data after distortion correction processing;

a distortion-correction coordinate transforming unit that applies a predetermined distortion correcting formula to the generated interpolation coordinate for transformation into coordinate positions of pixels in the coordinate system of the image data before distortion correction processing; and a correcting range detecting unit for calculating the input image range necessary for the block image data in the image data before distortion correction processing from the transformed coordinate position, wherein the distortion correction range calculating unit calculates the input image range for distortion correcting processing on a next block of image data concurrently with execution of the distortion correcting processing of a block of image data preceding said next block of image data by the distortion correcting unit.

2. The image processing apparatus according to claim 1, wherein the coordinate generating unit generates the interpolation coordinates by using only coordinate positions corresponding to pixels of a peripheral portion of a side of an output image range after distortion correction processing.

3. The image processing apparatus according to claim 2, wherein a shape of the output image range is rectangular, and the coordinate generating unit generates the interpolation coordinates by using only coordinate positions corresponding to pixels of four sides of the rectangular output image range.

4. The image processing apparatus according to claim 3, wherein the distortion correction range calculating unit calculates the input image range based on at least one of maximum and minimum values of the coordinate positions of the pixels corresponding to the four sides of the rectangular output image range and coordinate positions corresponding to pixels of four vertexes of the rectangular output image range, with respect to the coordinate positions generated by the coordinate transformation.

5. The image processing apparatus according to claim 1, wherein the distortion-correction coordinate transforming unit performs the calculation included in the predetermined correcting formula on time-series data.

6. The image processing apparatus according to claim 1, wherein the coordinate generating unit obtains interpolation coordinates by performing predetermined thinning-out processing with respect to the interpolation coordinates for distortion correction processing.

7. The image processing apparatus according to claim 1, wherein the distortion correcting range calculating unit calculates the input image range by sequentially repeating the input image range calculation with respect to a plurality of input signals for distortion correction processing.

8. The image processing apparatus according to claim 1, wherein the input image range calculation is performed repeatedly, and a correcting magnification M is determined such that an image range after distortion correction processing comes within a predetermined range with respect to the input image range.

9. The image processing apparatus according to claim 7, wherein the input image range calculation is performed repeatedly, and a correcting magnification M is determined such that an image range after distortion correction processing comes within a predetermined range with respect to the input image range.

* * * * *